A. SUNDH.
AUTOMATIC BLOCKING MECHANISM FOR STRIP MILLS.
APPLICATION FILED OCT. 11, 1915.
1,237,575.
Patented Aug. 21, 1917.
10 SHEETS—SHEET 1.
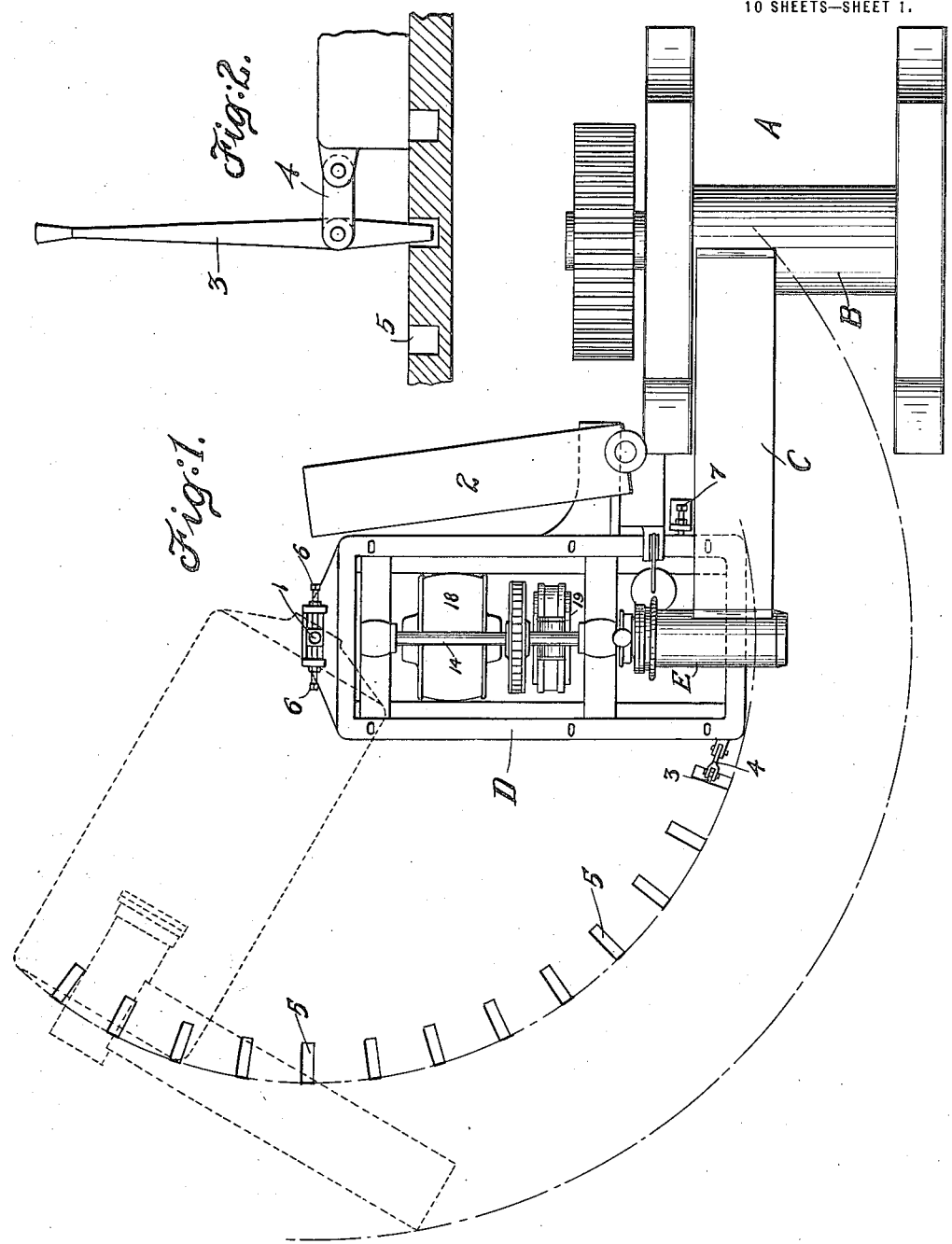
WITNESSES:
INVENTOR
BY
ATTORNEY A. SUNDH.
AUTOMATIC BLOCKING MECHANISM FOR STRIP MILLS.
APPLICATION FILED OCT. 11, 1915.
1,237,575.
Patented Aug. 21, 1917.
10 SHEETS—SHEET 2.
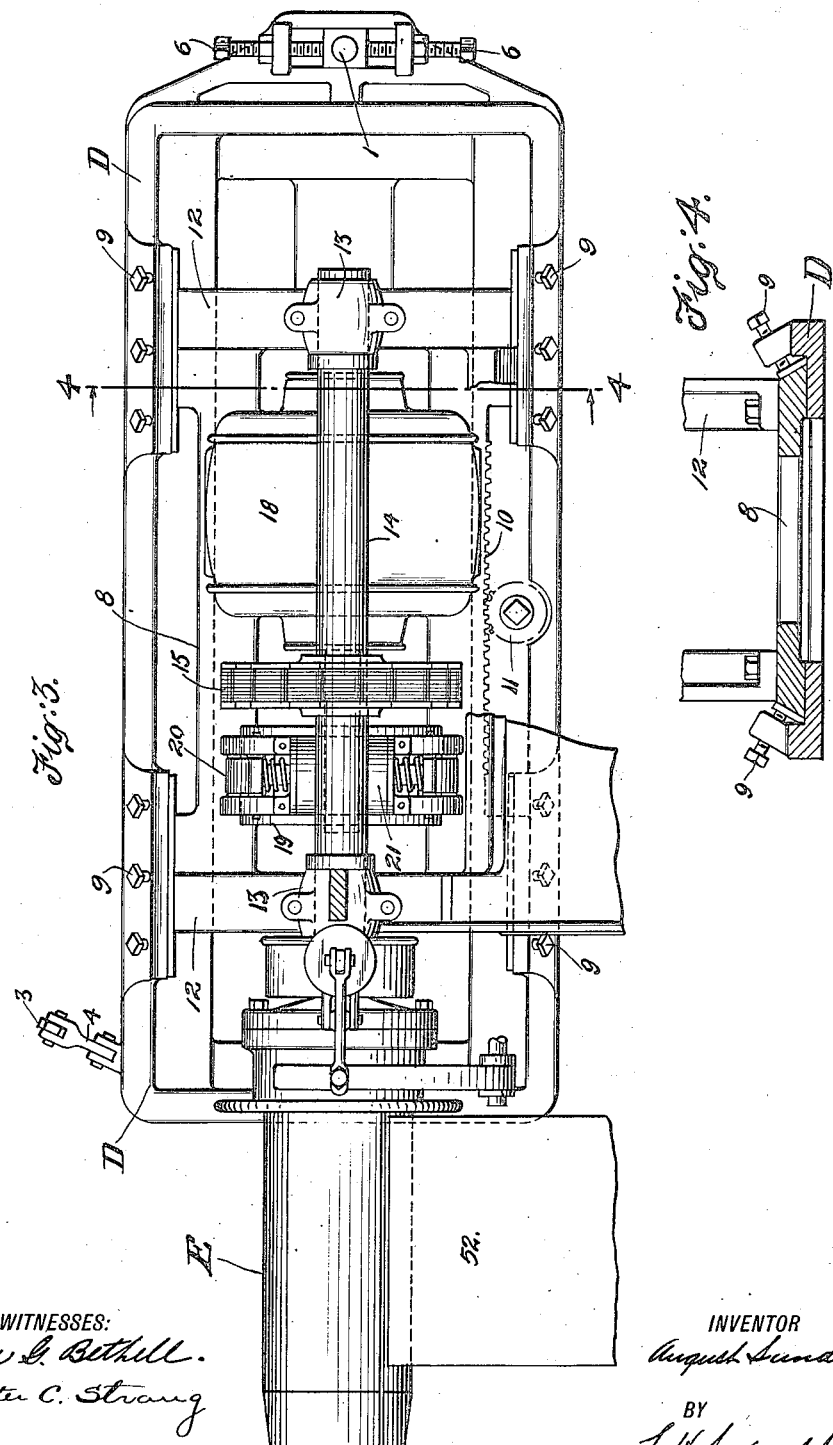
WITNESSES:
James G. Bethell.
Walter C. Strang
INVENTOR
August Sundh
BY
ATTORNEY

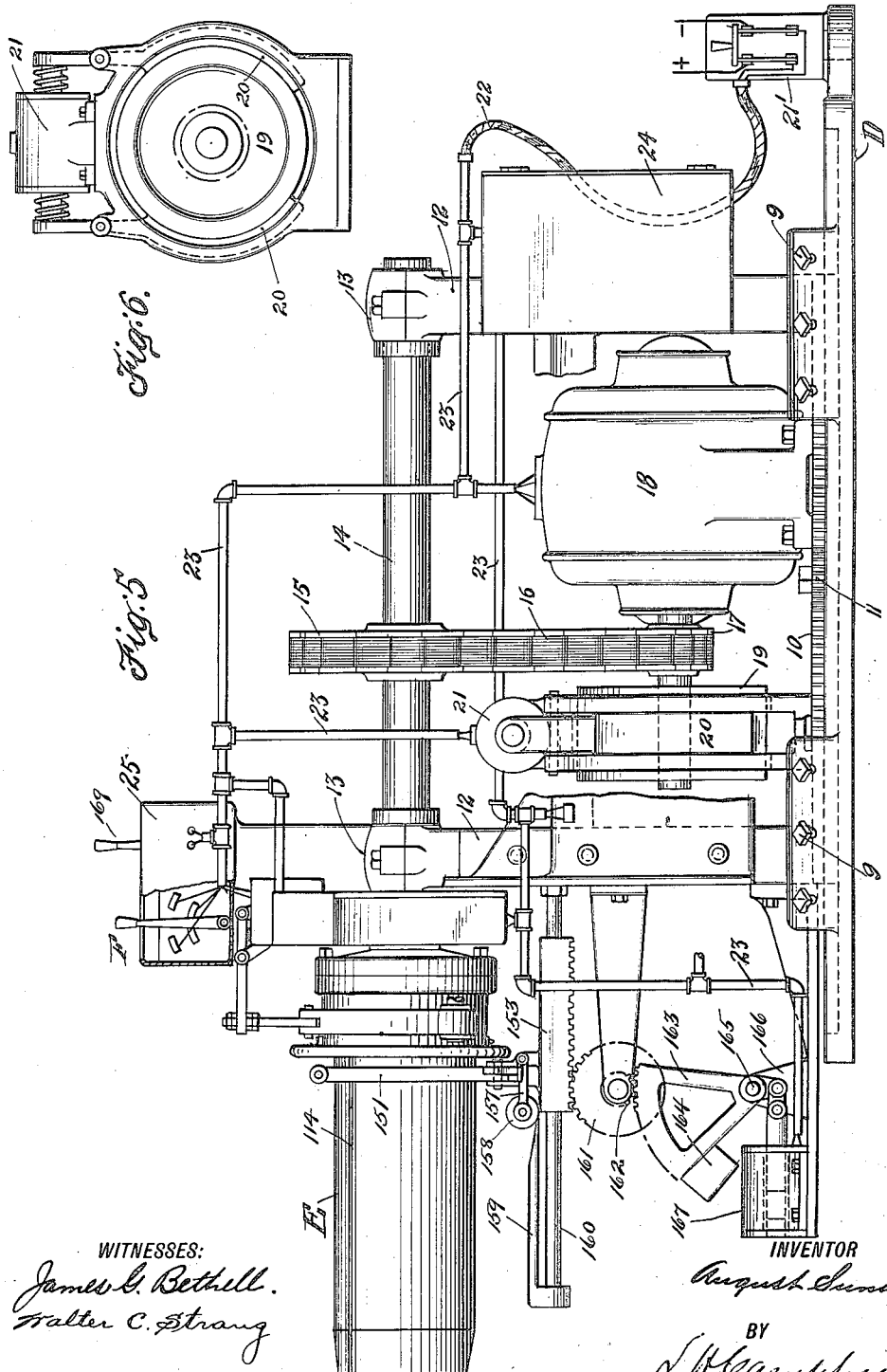

A. SUNDH.
AUTOMATIC BLOCKING MECHANISM FOR STRIP MILLS.
APPLICATION FILED OCT. 11, 1915.
1,237,575.
Patented Aug. 21, 1917.
10 SHEETS—SHEET 4.
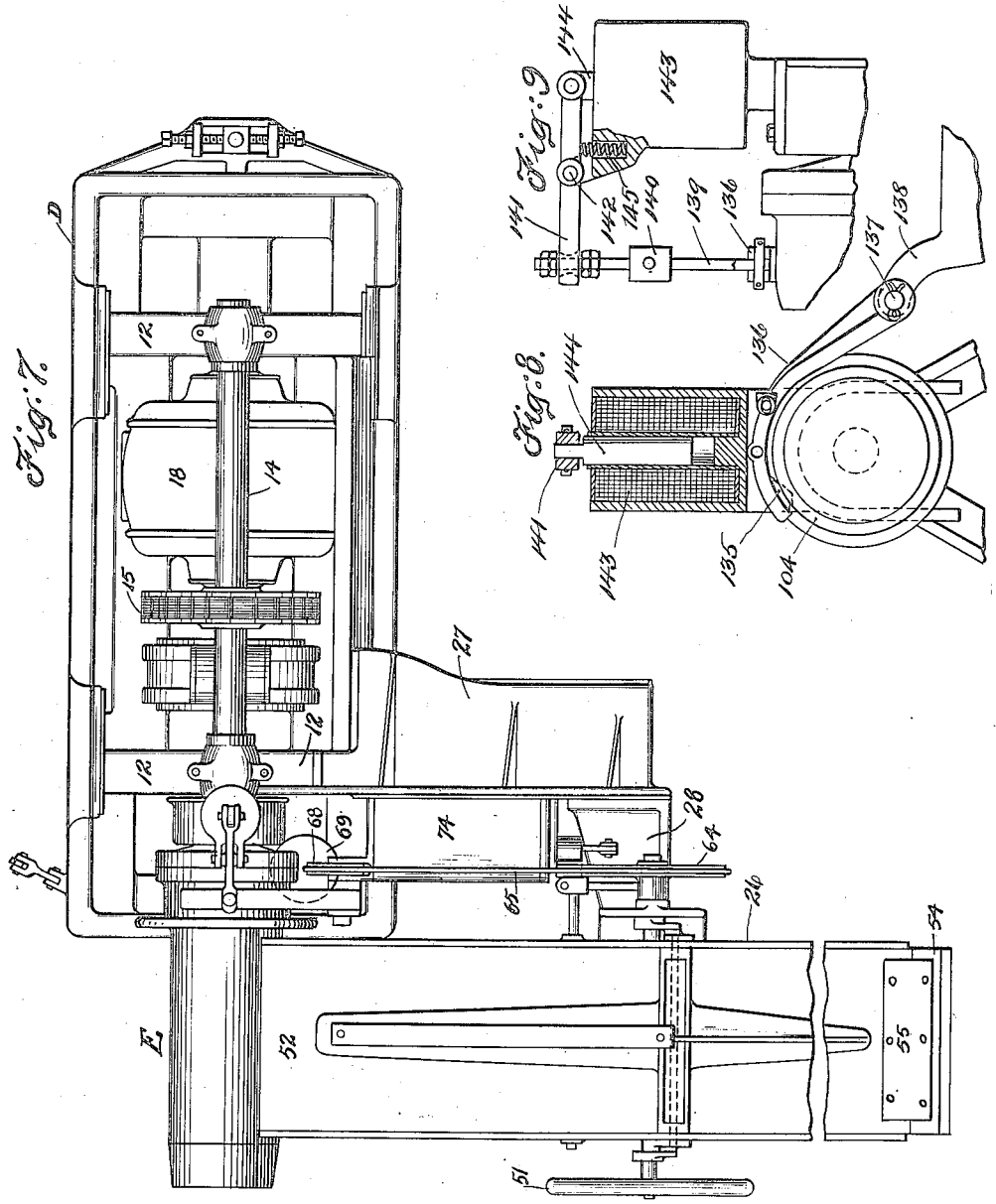
WITNESSES:
James G. Bethell
Walter C. Strang
INVENTOR
August Sundh
BY
L. H. Campbell
ATTORNEY

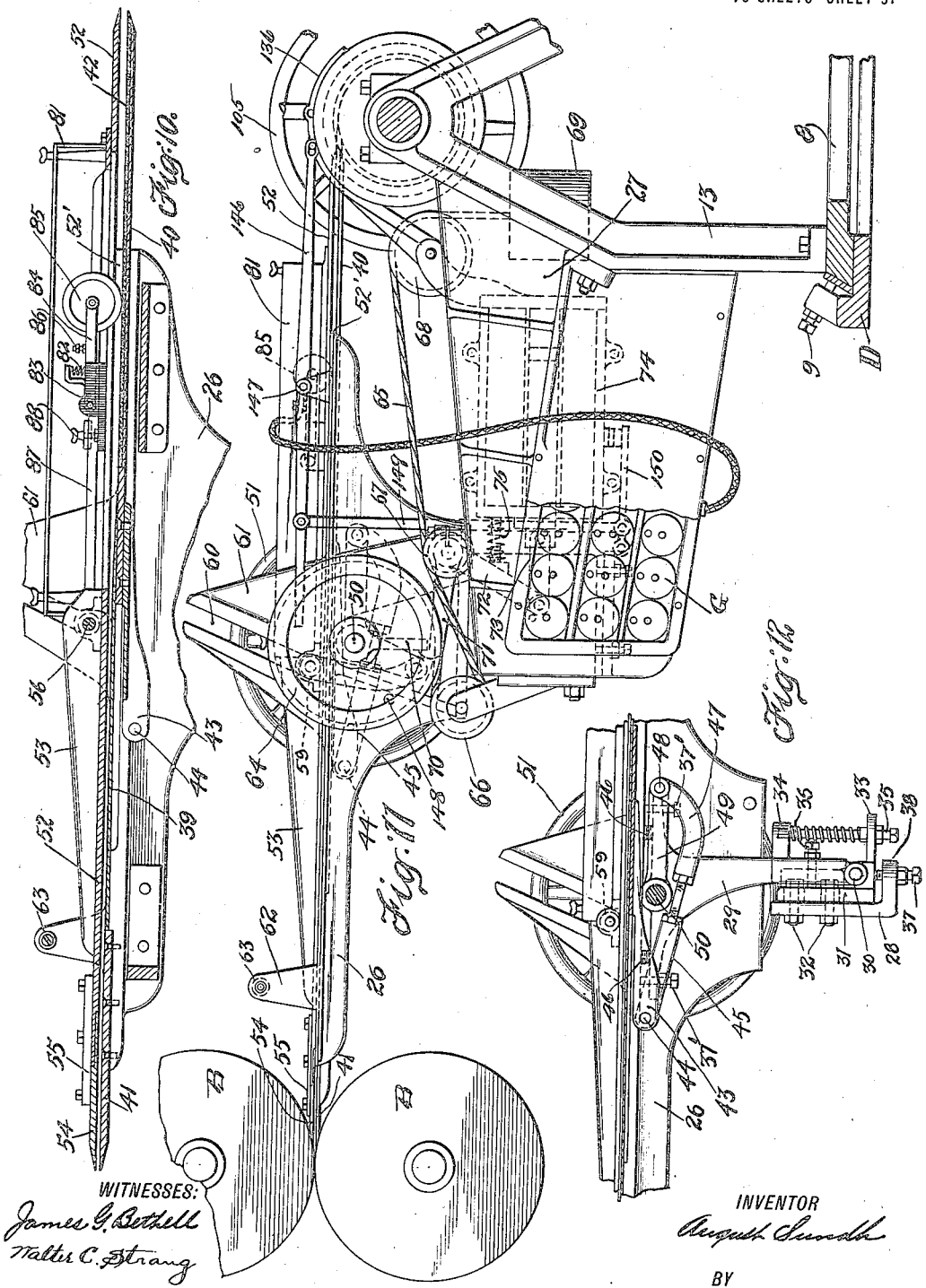

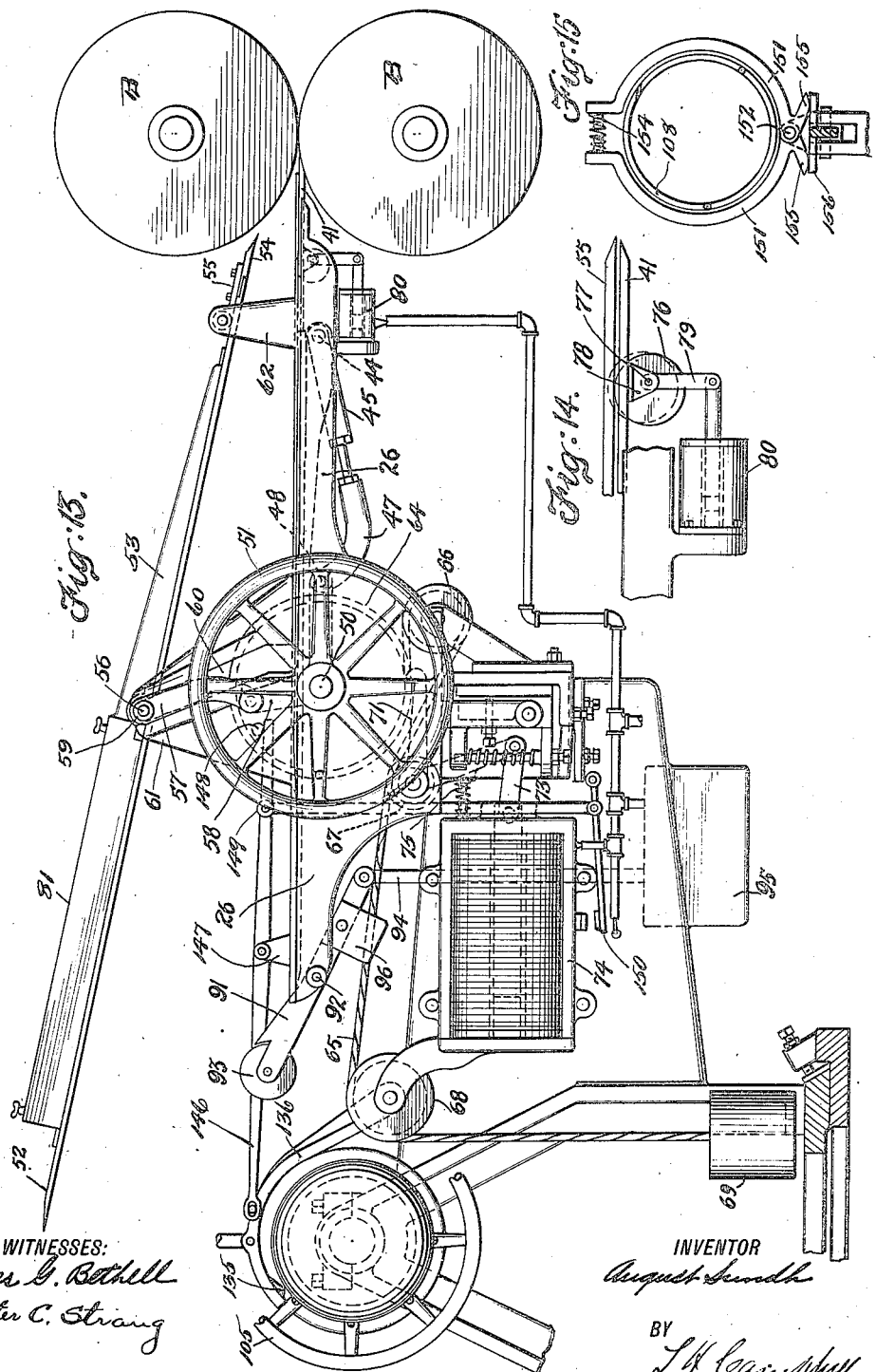

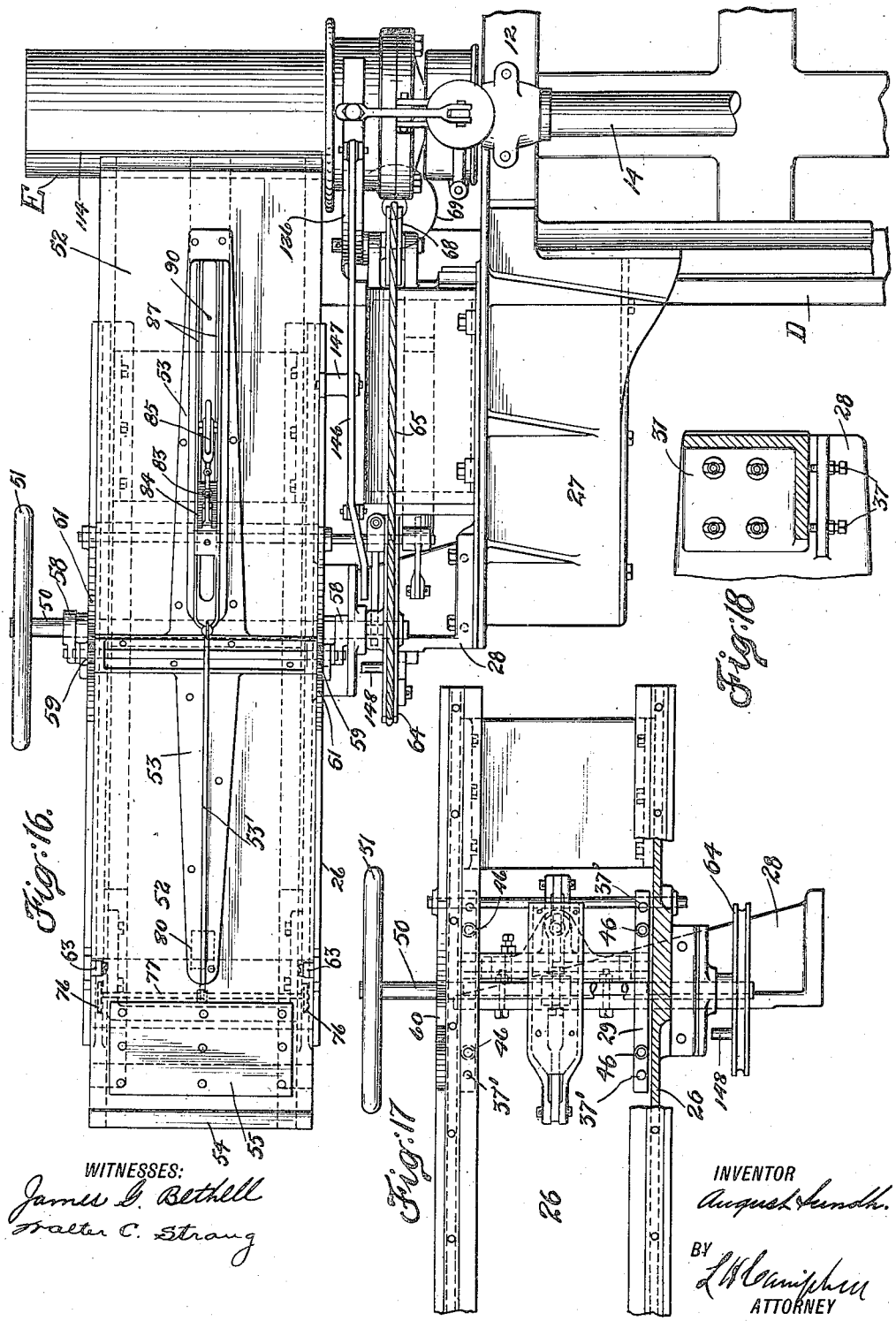

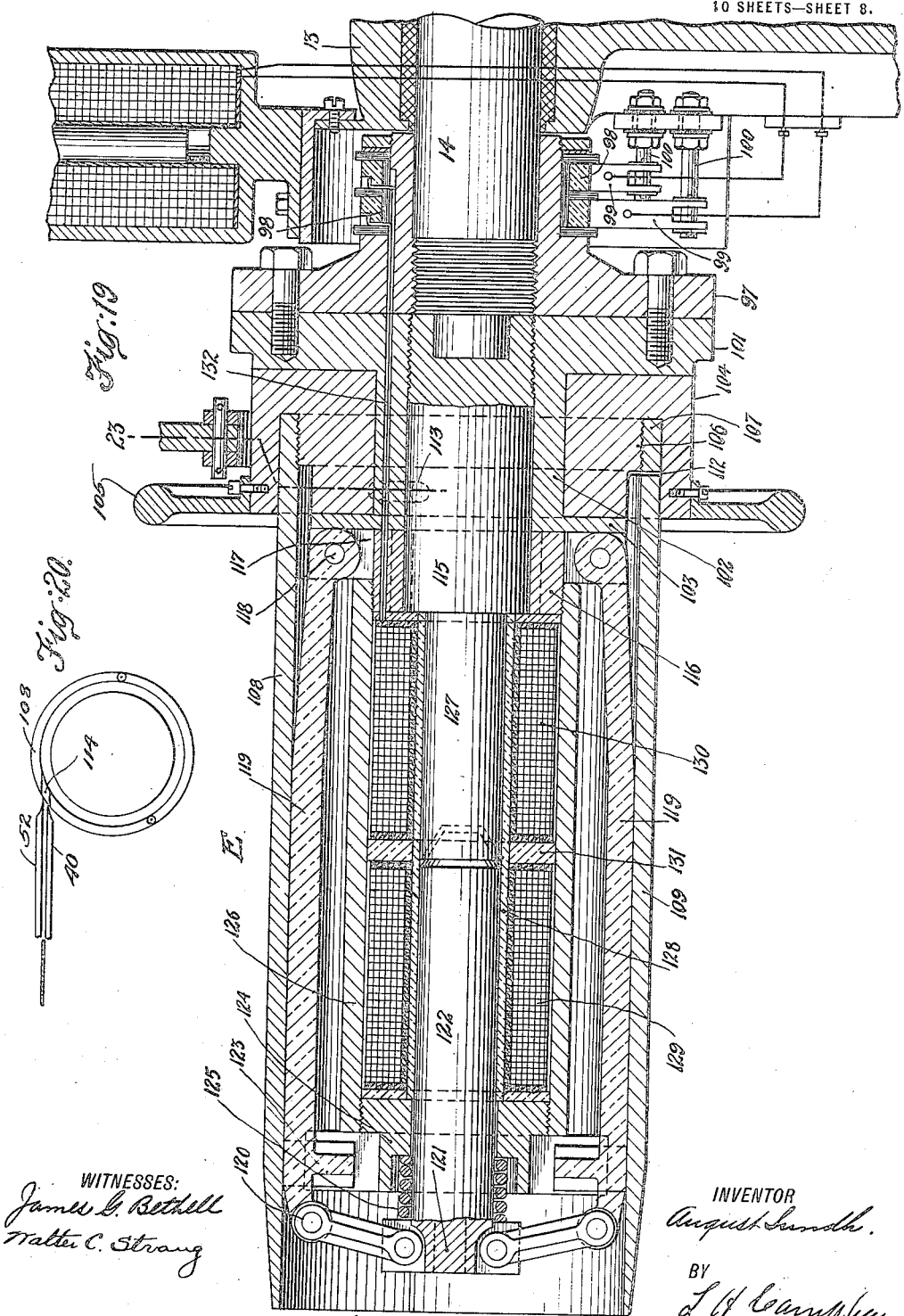

A. SUNDH.
AUTOMATIC BLOCKING MECHANISM FOR STRIP MILLS.
APPLICATION FILED OCT. 11, 1915.
1,237,575.
Patented Aug. 21, 1917.
10 SHEETS—SHEET 9.
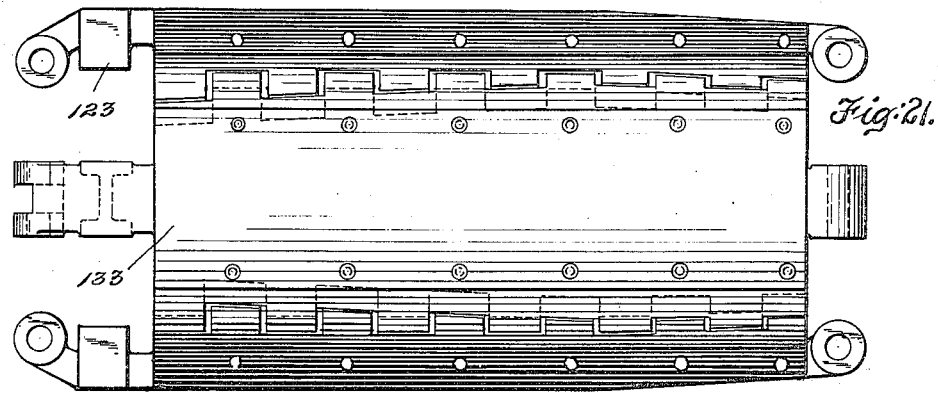
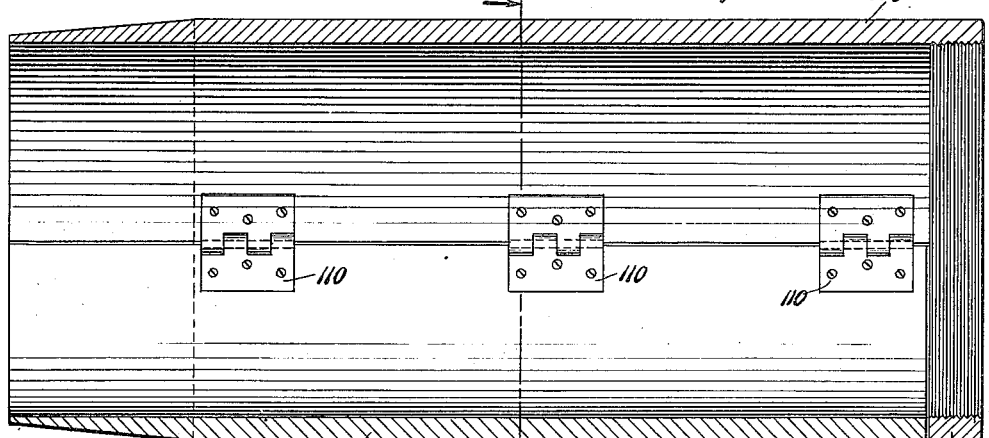
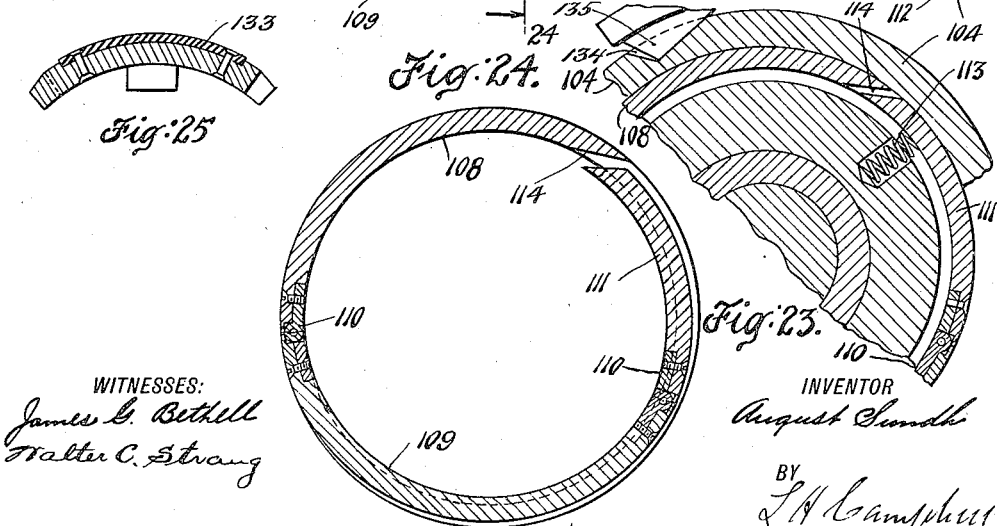
WITNESSES:
James G. Bethell
Walter C. Strang
INVENTOR
August Sundh
BY
J. H. Campbell
ATTORNEY

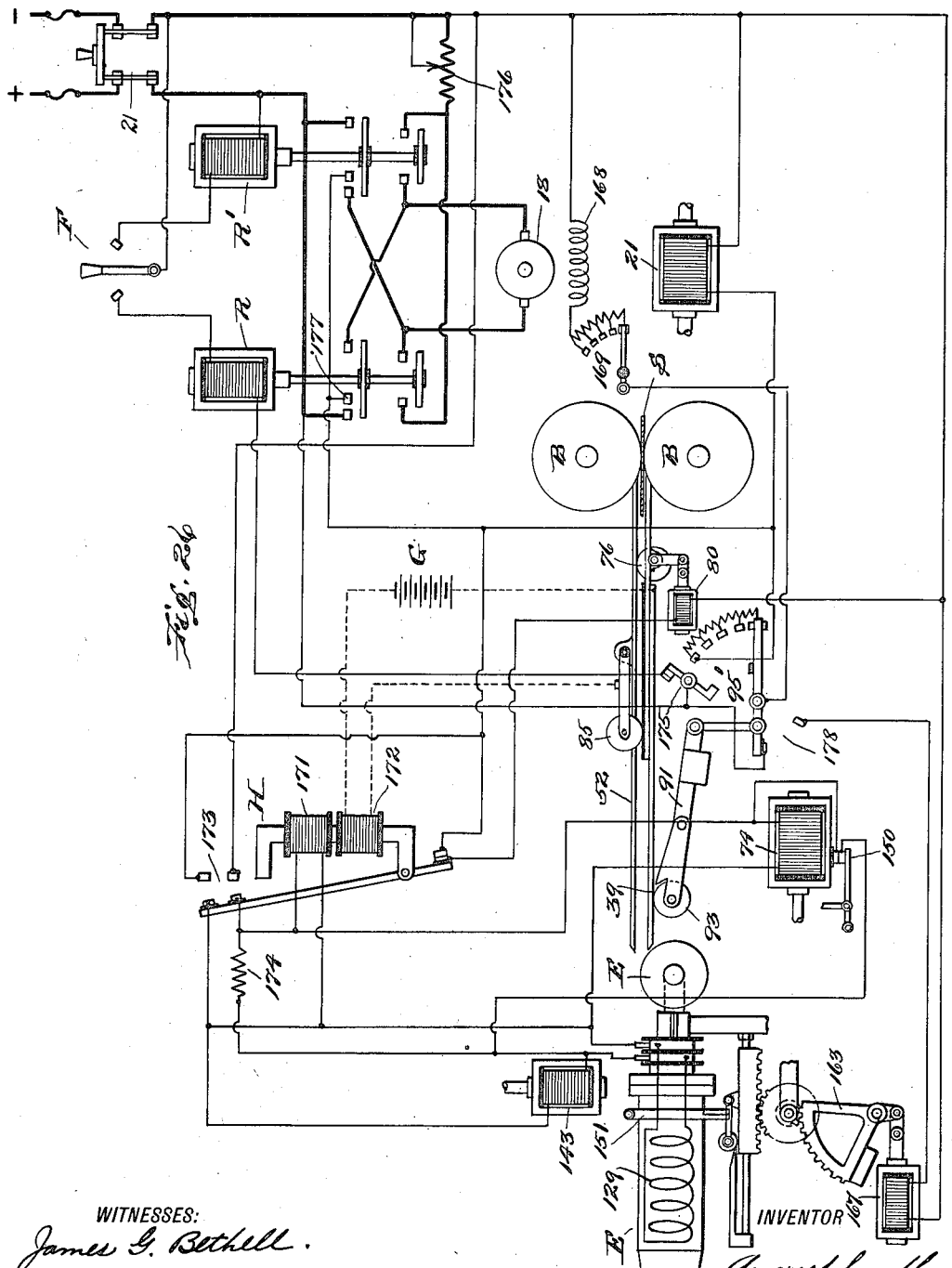

UNITED STATES PATENT OFFICE.

AUGUST SUNDH, OF HASTINGS-UPON-HUDSON, NEW YORK.

AUTOMATIC BLOCKING MECHANISM FOR STRIP-MILLS.

1,237,575.  Specification of Letters Patent.  Patented Aug. 21, 1917.

Application filed October 11, 1915. Serial No. 55,361.

*To all whom it may concern:*

Be it known that I, AUGUST SUNDH, a citizen of the United States, residing in Hastings-upon-Hudson, in the county of Westchester and State of New York, have invented a new and useful Improvement in Automatic Blocking Mechanism for Strip-Mills, of which the following is a specification.

My invention relates to strip mills, and is directed more particularly to mechanism for automatically blocking or coiling the strip after it has passed through the rolls of the mill.

One object of the invention is the provision of automatic means for guiding and blocking the strip in such manner as entirely to obviate the necessity of personal attention on the part of the operator, and thereby remove the cause of frequent and often serious accidents which are prevalent in machines of this nature in which the blocking of a strip is effected either partially or wholly by hand.

Another object of the invention is the provision of automatic means for effecting a driving engagement between the strip and block substantially at the instant that the advancing end of the strip reaches a predetermined position with respect to the block so that the strip shall first be properly secured to the block and then coiled thereon to any desired amount, under uniform tension throughout the entire blocking of the strip, and thereby insure a snugly wound coil and prevent any buckling or tearing of the strip between the block and the rolls of the mill.

A further object of the invention is the provision of automatic blocking mechanism in which the block may rotate at high speed so as to enable the strip mill to operate up to its maximum capacity, and after the strip is completely blocked the machine is automatically stopped and the coil of strip material ejected therefrom.

A still further object of the invention is the provision of a device of the class described involving automatic features in part electrical which enable one to attain the several objects herein set forth as well as others in a simple, practical and efficient manner, devoid of complications and which may be operated at any speed upon any strip material up to the full capacity of the strip mill.

Other objects of the invention will appear hereinafter, the novel combinations of elements being pointed out in the appended claims.

The accompanying drawings illustrate one embodiment of my invention in which Figure 1 is a plan view of the blocking mechanism and strip mill, showing how the blocking mechanism may be swung into and out of operative relation with the strip mill, and also adjusted with respect thereto; Fig. 2 is an elevation view of the shifting device for the blocking mechanism; Fig. 3 is an enlarged plan view of the blocking mechanism; Fig. 4 is a fragmentary sectional view of Fig. 3, the section being taken on the line 4—4; Fig. 5 is an elevation view of the block mechanism and its driving motor; Fig. 6 is a side view of the brake of Fig. 5; Fig. 7 is a plan view of the block and strip guiding mechanism; Figs. 8 and 9 are detail views of certain parts of the mechanism; Fig. 10 is a sectional elevation view of the upper and lower strip guides; Fig. 11 is an elevation view of the guiding mechanism showing its relation to the mill rolls and the winding block; Fig. 12 is a view similar to Fig. 11, showing some of the parts removed; Fig. 13 is a view similar to Fig. 11 showing the opposite side of the mechanism with the guides in operated position; Fig. 14 is a detail view of a device for spreading the ends of the guides into contact with the mill rolls; Fig. 15 is an end view of the block ejecting mechanism; Fig. 16 is a plan view of the upper guide and associated mechanism; Fig. 17 is a plan view of the guide table with the guide removed; Fig. 18 is a detail view of the guide adjusting mechanism shown in Fig. 12; Fig. 19 is an enlarged sectional view of the winding block; Fig. 20 is a diagrammatic end view of the winding block and strip guides; Fig. 21 is an elevation view of the inner block member; Fig. 22 is a longitudinal section view of the outer block member; Fig. 23 is a section view of Fig. 19, the section being taken substantially on the line 23; Fig. 24 is a section of Fig. 22 on the line 24—24; Fig. 25 is a sectional view of one of the expanding elements of Fig. 21; Fig. 26 is a wiring diagram of the system of electrical control.

Like reference characters denote similar parts in all of the figures.

In general, the invention comprises, in connection with a strip mill, parallel horizontal guides for directing the strip from the mill rolls to the winding block, electromagnetic means associated with the block for connecting the strip to the block at the proper instant, means for effecting the withdrawal of the guides from their initial position adjacent the block so that the latter may reel up or block a strip of almost unlimited length without interference from any part of the guide mechanism, and means for automatically stopping the block and then loosening the coiled strip from the block and ejecting it therefrom when the blocking operation is completed.

Referring to the drawings, I show in Fig. 1 a strip mill A comprising the usual rolls such as B, the upper roll being removed so as better to show the position of the strip guides C with respect to the mill rolls. The entire blocking mechanism including the guides C, is carried upon a bed D one end of which is pivoted to a stud 1 secured to the floor so that the entire blocking mechanism may be swung clear of the mill as indicated by the broken lines, so that the latter may be used without the blocking mechanism or to permit the usual coiling table 2 to be swung into position, if desired. A lever 3 is secured by a link 4 (see Fig. 2) to the opposite end of the bed, and this lever is adapted to be rocked back and forth so as successively to engage the slots 5 in the floor, and in this manner the bed is easily swung upon the pivot 1. The screws 6 are adapted to alter the position of the bed with respect to the pivot 1, and by adjusting these screws, together with a screw 7 carried in a bracket near the opposite end of the bed, the position of the bed may be adjusted with great precision. This feature of adjustment is of great convenience, and enables one to locate the guides C in an exact position with respect to the mill rolls.

Figs. 3, 4 and 5, illustrate the blocking mechanism in plan, part section and elevation, respectively, and the same comprises a base 8 slidable on the bed or sub-base D and locked in adjusted position by the screws 9. The base 8 is provided with a rack 10 meshing with a gear 11 mounted on the bed D, and the gear stem is squared to receive a wrench, whereby the base and parts thereon may be moved over the bed in one direction or the other with but little effort. By reason of this sliding adjustment, the guides C may readily be shifted across the mill rolls so as to receive the strip from any part of the rolls, a feature of importance, inasmuch as it is customary in the operation of strip mills to feed the strip to different parts of the surface of the rolls from time to time so as to insure that the wear on the rolls shall be uniform throughout their length.

At either end of the base 8 I provide a bearing stand 12 each of which carries a bearing 13 in which is journaled a shaft 14 which carries the winding block E. A gear 15 is secured to the shaft 14 and in the present instance is driven by a silent chain, 16, from a gear 17 carried on the shaft of an electric motor 18. The latter is carried on the base 8 and is provided with a brake pulley 19 which is engaged by a pair of spring pressed brake shoes 20, 20, the brake shoes being released by an electro-magnet 21, whenever a circuit is closed to the brake magnet winding, and are applied by the springs whenever this circuit is broken. At the extreme right hand end of the bed (see Fig. 5) is provided a main line switch 21' which is connected by a flexible conduit 22 to the conduits 23, 23, containing conductors which lead to various parts of the device as will be pointed out later in connection with the wiring diagram shown in Fig. 26. The flexible conduit 22 is of great convenience in that it permits the base 8 to be shifted upon the bed D throughout its entire range of movement without having to disturb any of the electrical connections. The right hand bearing stand 12 carries a switch box 24 while the left hand stand carries among other things a controller or switch box 25, the mechanism for ejecting the completed block of strip, and the strip guiding mechanism.

The strip guiding mechanism comprises a substantially horizontal guide carrier or table 26 (see Figs. 7 and 16) which is supported by the brackets 27 and 28 secured to the bearing stand 12 and adapted to have a universal adjustment, in that it may be raised or lowered and tilted so as to insure that the guides may be properly positioned with respect to both the mill rolls and the winding block. In order to effect this adjustment, the table 26 is supported by a pair of bracket arms 29 (see Figs. 12 and 17) which are carried upon a shaft 30 carried by a support 31 bolted to the bracket 28 by bolts 32. The support 31 is formed with a projecting piece 33 in vertical alinement with a similar projecting piece 34 formed integral with the bracket arms 29 of the table, while a screw 35 is threaded into the part 33 and engages the part 34. Another screw 36 is threaded into the part 29 and bears against the support 31. By manipulating the screws 36 and 35 the table may be leveled up or tilted in either direction as desired, a compression spring surrounding the bolt 35 and serving the purpose of taking up all lost motion. In order to raise or lower the table, the nuts on the bolts 32 are backed off and the screws 37 turned one way or the other so as to move the table support 31 on the bracket 28, the bolt holes in the support 31 being slotted so as to permit sufficient movement. (See Fig. 18). In addition to the hand adjustment of the table 26 just described I provide an automatic adjustment as well, comprising the four adjustable bolts 37' carried by the bracket arms 29 upon which part of the weight of the table rests, springs 46 being interposed between the table and bracket arms so as to support the remaining weight of the table and to take up all lost motion. A shaft 50 passes loosely through both bracket arms and through the aprons on the table so as to permit a small movement of the table in all directions, and permit the table together with the guides automatically to adjust itself and thereby insure that the guides will remain in perfect alinement with the mill rolls even though the latter become worn and cease to be truly cylindrical.

The upper surface of the guide table 26 is provided with two guiding members 39 and 40 (see Fig. 10) which together form the lower guide surface for the strip. The member 39 is suitably fastened to the table, and extends to within a short distance of the left hand end of the same. A strip of highly tempered steel 41 forms an extension of the guide member 39 and this strip is fastened by countersunk screws to the top of the table and extends beyond, its outermost edge being chamfered so as to form a sharp edge adapted to engage the lower roll of the mill and strip off the sheet of strip as it passes through the mill rolls. By reason of this construction, the steel strip 41 may readily be removed for dressing or a new one fastened in its place in case it becomes unduly worn after long continued use. The right hand part 40 of the lower guide of Fig. 10 is adapted to slide in guides upon the top of the table and under the fixed strip 39, the right hand part of the latter being beveled or chamfered so that the upper surface of the entire lower guide comprising the parts 39, 40 and 41, presents a smooth unbroken surface. The part 40 is chamfered at its outward end and carries a narrow strip of insulation 42 countersunk into the part 40 so as to be flush with the surface. The other end of the slide 40 is secured to a bracket 43 which is connected (see Fig. 12) at 44 to a link 45 which in turn is connected by a right and left threaded adjusting screw to a curved link 47, the other end of which is connected at 48 to a lever 49 secured on the shaft 50 of a hand wheel 51. By reason of this construction, it is readily seen from Figs. 10 to 13, inclusive that by rotating the shaft 50 in one direction or the other, the lower guide 40 is extended or withdrawn as the case may be, according to Figs. 13 and 11, respectively, the links 45 and 47 and the lever 49 constituting what may be termed a toggle lock whenever the slide 40 is fully extended or retracted, so that the slide is always locked against any movement until released by the rotation of the shaft 50.

The upper guide comprises a continuous guide strip 52 which is normally positioned a short distance above the lower guide structure 39, 40, 41, determined by the raised parallel strips 52' as shown in Figs. 10 and 11, and is secured to a bracket 53 which extends substantially the entire length of the guide strip 52 and thus greatly stiffens and strengthens it. To the left hand end of the guide strip 52 is secured a tempered steel wearing strip 54 by means of a plate 55, the strips 52 and 54 being flush-jointed so as to form a smooth unbroken surface, while the end of the strip 54 is chamfered off similar to the adjacent strip 41 of the lower guide, so as to bear against the upper roll of the mill and strip off the sheet of strip as it passes, the mill rolls. A rod 56 extends across the bracket 53 and passes through the center web 53' and also loosely through each side of the bracket and to each end of this rod is secured a link 57 (see Figs. 11, 13 and 16) connected to a lever 58 fastened to the hand wheel shaft 50. Rollers 59 are positioned on the rod 56 adjacent the links 57, and these rollers are adapted to travel in cam slots 60, 60, formed in the upstanding guide members 61, 61, located at either side of the guide table. Toward the end of the table adjacent the mill rolls I provide a pair of oppositely disposed uprights 62, 62, each of which carries a roller 63 adapted to be engaged by the upper surface of the upper guide 52 when the latter is raised as shown in Fig. 13. By reason of this construction if the upper slide be in normal lowered position as shown in Fig. 11, and the hand wheel 51 be rotated, the levers 58, 58, on the hand wheel shaft carry the links 57, 57 upwardly and in consequence the entire upper guide is raised into the position shown in Fig. 13. It will be observed that, owing to the cam slots 60, 60, the upper guide is given a compound motion, that is to say, its motion has both a vertical and horizontal component. This feature is important, since it is necessary to raise the guide out of any possible contact with the coil of strip on the winding block as the coil builds up in diameter in blocking, and it is also necessary to give the upper guide a horizontal movement or movement away from the mill rolls, otherwise the sharp edge of the wearing strip 54 would tend to cut into or interfere with the free passage of the strip as it leaves the mill rolls. The stationary rollers 63, 63, guide the end of the upper guide and limit its upward movement and the guide bears against these rollers by reason of the unbalanced weight of that part of the guide lying on the opposite side of the rod 56 which supports the guide in raised position.

By rotating the hand wheel 51 manually, the upper guide is raised or lowered, while the lower guide is simultaneously retracted or extended, respectively, but in the actual operation of the blocking device, the hand wheel is used merely to lower the upper guide and extend the lower guide into normal position shown in Fig. 11 after they have been automatically operated into the position shown in Fig. 13. This automatic operation is effected by the following mechanism: Upon the hand wheel shaft 50 is secured a grooved sheave 64 (see Figs. 11, 16 and 17) upon which is wrapped and secured a flexible cord or chain 65 which leads under a guide pulley 66 and over two guide pulleys 67 and 69 and its free end is fastened to a weight 69. The function of the weight is to rotate the sheave 64 in a direction to raise the upper guide and retract the sliding lower guide 40 when free to act. The sheave 64, however, is normally locked against rotary movement as shown in Fig. 11, by reason of a detent 70 carried by the sheave which is engaged by a catch 71 on the bell crank lever 72. This lever is connected by a link 73 to the core of a solenoid 74 and the catch is normally held in engaging position with the detent by means of a spring 75. It will be understood that when the hand wheel 51 is manipulated to move the guides into normal position, the detent 70 rides over the tapered nose of the catch 71 and the guides become locked in position. When a circuit is established to the magnet winding of the solenoid 74 the catch is released from locking position and the weight 69 immediately moves the guides into the position shown in Fig. 13.

When the guides are in normal position it is very desirable that the wearing strips 54 and 41 shall bear against their respective mill rolls so as to strip off the advancing end of the strip as it leaves the rolls, and thereby insure that the end of the strip will not stick to a roll after it has passed through, and further to insure that the end of the strip will properly enter between the upper and lower guides. In order to effect this result I provide a pair of eccentrics 76, 76 (see Figs. 14 and 16) fixed to a shaft 77 journaled in brackets 78, 78, secured to the under side of the lower guide adjacent the mill rolls and extending up through slots in the guide slightly removed from the path of travel of the strip through the guides. A lever 79 is secured to the shaft 77 which is actuated by a solenoid magnet 80 secured to the table. When the latter is energized, the eccentrics are partially rotated and hence exert a thrust upon the lower surface of the upper guide and in this way force the wearing strips 54 and 41 apart and into intimate contact with their respective mill rolls. The operated position of the eccentrics is clearly indicated by the broken lines in Fig. 14.

Referring to Figs. 10 and 16: The bracket 53, which is secured to the upper slide 52 contains a long narrow slot 90 which registers with a corresponding slot in the upper slide 52. Each side of the slot in the bracket is provided with a slide way 87 on which slides a block of insulating material 83 which may be clamped against movement by a wing nut 88. Pivoted to the insulation 83 is a lever 84 which carries at one end a contact brush or roller 85 of brass or other suitable conducting material, through which a circuit may be closed from a low voltage battery G, by a flexible conduit to the binding post 86. The upper slide 52 being slotted, the contact roller will normally rest upon the strip of insulation 42 set into the lower slide, and when the advancing edge of the strip coming upon the mill reaches the brush or roller 85, the roller is engaged and moved upwardly the thickness of the strip and rolls over its upper surface. When the strip being blocked is of rather thick material, I use a spring 82 for preventing the roller from bounding away from the strip as the two come into contact, but with thin strips the spring 82 may be removed as the weight of the roller and its arm is sufficient for the purpose. A removable box cover 81 is adapted to inclose the slot 90, contact roller and adjacent parts.

Referring to Fig. 13, I show a lever 91 pivoted at 92 to the end of the table and in alinement with its center. One end of this lever carries a roller 93 while the other end is connected by a rod 94 to a switch contained in the box 95 which controls the motor 18 operating the winding block. A weight 96 may be adjusted in position along the lever arm 91, and this weight tends to raise the end of the lever carrying the roller 93 and depress the rod 94 and thus actuate the switch. When the upper slide is lowered by means of the hand wheel 51, the roller is pressed downwardly to its full extent of movement and is maintained in this position even after the upper slide is raised by reason of the roller 93 contacting with the under side of the strip being wound on the block. As the diameter of the coil of strip on the block increases, the roller 93 gradually rises and consequently alters the speed of the revolving block in proportion. As soon as the blocking operation is completed, the roller 93 is free to rise to its fullest extent and the motor driving the block is automatically stopped as will be pointed out in detail hereinafter.

The winding block E upon which the strip is coiled or blocked, is shown in Fig. 19, and comprises a flange 97 which is threaded onto the end of the motor driven shaft 14. The hub of this flange carries a pair of insulated slip rings 98, 98, upon which bear corresponding spring pressed brushes 99 carried upon insulated studs 100 secured to the frame of the shaft bearing 13. Secured to the flange 97 by suitable bolts is a flange 101 formed integral with a sleeve 102 which sleeve is provided at its other end with a flange 103. Between the flanges 101 and 103 and loosely fitting the sleeve 102 is a collar 104 to the periphery of which is secured a hand wheel 105. An annular groove is cut in the lateral face of the collar and is threaded at 106 to receive a ring 107 formed integral with an arc shaped member or segment 108 shown in section in Fig. 23, and which extends outwardly from the ring and forms a part of the winding block. To the member 108 is hinged a similar arc shaped segment 109 by means of the countersunk hinges 110, and to the member 109 is hinged by similar countersunk hinges a third arc shaped member 111, the three connected members or segments forming a cylindrical shell or casing, which comprises the outer collapsible part of the block upon which the strip is coiled. It will be noticed that the parts 109 and 111 extend within the counterbored portion of the annular groove in the collar 104, and a substantial space 112 is left between them and the ring 107. While the part 108 is rigid on the collar, the counterbore in the collar permits the parts 109 and 111 to collapse a limited amount as shown in Figs. 23 and 24, and one or more springs such as 113 normally expand these parts into contact with the outer periphery of the counterbore so that the three parts 108, 109 and 111 together form a cylinder as shown in Figs. 19 and 23, whose outer periphery forms a smooth cylindrical surface which is preferably tapered at one end as shown. A slot 114 is provided between the fixed and hinged sections 108 and 111, respectively, the slot extending the entire length of the cylinder and parallel to its axis. By reason of this construction, the cylindrical shell may be rotated on the sleeve 102 by means of the hand wheel 105 except at such times as it is connected to rotate with the shaft 14 by the expansion of the internal block mechanism which will now be described.

Referring more particularly to Fig. 19, I show a short shaft 115 which is threaded into the flanged sleeve 102 and hence is rigid with the driving shaft 14. A collar 116 is keyed to the shaft 115 and is provided with a plurality of upstanding lugs 117 arranged in pairs, each pair of which, I show four by way of example, being equally spaced upon the collar 116, and to which is pivoted by a pin 118 one of a corresponding number of similar segments 119. The longitudinal edges of each of the segments 119 are notched as shown in Figs. 21 and 25 so that the segments when assembled in position on their pivot pins 118 will fit into each other as shown so as to form a smooth cylindrical outer surface which is tapered a little toward the right hand end. The end of each segment opposite its pivot carries a link 120 pivoted to a slotted collar 121 formed on the core 122. Near the end of each segment is a stop piece 123 which is adapted to engage a collar 124 and thus limit the movement of the segment toward contracted position, this movement being effected by a compression spring 125 located between the collars 121 and 124. The latter is bored out somewhat larger than the diameter of the core 122 and is threaded into an iron or steel tube 126 whose other end is threaded onto the collar 116. Loosely surrounding the magnet core 122, and its coacting fixed core 127 which forms a part of the short shaft 115, is a brass sleeve 128 with a flange at both ends and upon this sleeve are arranged magnet coils 129 and 130 having a spacer 131 between them. Suitably insulated conductors 132 lead from the magnet coils to the slip rings 98, 98. In some cases I propose to use instead of the two coils 129 and 130 a single coil occupying the same space, but I find by using two or more coils that the assembly of the block is facilitated and also that the magnet coils lend themselves to circuits of different potentials for the reason that they may be connected in series or parallel relation or a combination of the two to suit conditions. As shown in Fig. 19 the segments 119 forming the inner block member are adapted directly to contact with the inner cylindrical surface of the outer block member comprising the segments 108, 109 and 111, but, as shown in Figs. 21 and 25, I propose in some cases to face the segments 119 with strips of leather 133 or other suitable material which may be countersunk flush with the surface as shown in Fig. 21 or else extend slightly above the surface as shown in Fig. 25.

It will be observed from the foregoing description that the inner block mechanism is connected to run with the motor driven shaft 14 while the outer block mechanism may be held stationary or rotated independently of the said shaft, both parts revolving as a unit when the inner block mechanism is expanded by the magnets. While the inner block mechanism is rotating and before the strip enters the block, it is necessary to insure that the outer block mechanism shall be at rest in a predetermined position, that is to say, the slot 114 in the outer block mechanism must register properly with the ends of the strip guides, as shown, for example, in Fig. 20. In order to do this, I provide a notch 134 in the surface of the ring 104 (see Figs. 8, 9 and 23) which is engaged by a wedge shaped detent 135 carried by a lever 136 pivoted at 137 to a suitable bracket 138. A rod 139 carrying a weight 140 is pivoted to the lever 136 and connected to a lever 141, which in turn is pivoted at 142 to a bracket cast integral with the casing of a magnet 130

143. The other end of the lever 141 is connected to a movable magnet core 144, which, when magnetized, tends to raise the rod 139 and thus lift the detent away from the notch 134. A spring 145 assisted by a weight 140 tends to press the detent in the notch and thus hold and prevent the outer block mechanism from rotation.

In order to hold the detent out of the notch after it has been raised by the magnet 143 and the latter is deënergized I provide a lever 146 (see Figs. 11, 13 and 16) which has a slot and pin connection with the lever 136 and is pivoted at an intermediate point to a bracket 147 carried by the guide table. The overhanging end of the lever 146 lies within the path of movement of a pin 148 secured to the sheave 64 upon the shaft 50 of the hand wheel 51. When the upper strip guide is in lowered position as shown in Fig. 11, the pin 148 is out of engagement with the lever 146, but as soon as the sheave 64 is rotated and the upper guide moves upwardly the pin 148 engages and bears down upon the end of the lever and thus the detent is held in raised position as shown in Fig. 13, the magnet 143 having previously raised it at the proper instant.

It will be understood that before the strip enters the block, the inner block mechanism is rotating while the outer block mechanism is at rest with the slot 114 exactly registering with the opening between the guides. When the advancing edge of the strip engages the contact roller 85, a circuit is closed to an electrically operated switch, which switch (the switch H of Fig. 26) effects the simultaneous energization of the block magnets and the magnet 143 of the releasing device for the outer block mechanism. While the circuit to the switch is closed the instant the strip contacts with the roller 85 and before the strip reaches the block, the block will not at once be energized since the switch possesses a certain time constant and this time constant is such that the strip will have entered the slot 114 in the block and passed some distance beyond before the inner block mechanism is energized and expanded. Hence a substantial portion of the strip is within the block when the inner mechanism of the block is expanded and there willl be no danger of the strip being pulled away from the block after it is once clamped thereto. While the time constant of the switch may be a constant factor, the speed of different strips may vary, and in order that the strip may always be gripped by the expansion of the inner mechanism of the block at the proper instant I regulate the position of the contact roller 85 toward or away from the block just as the occasion warrants.

As before pointed out, it is essential that the outer block mechanism shall be released by its magnet 143 at the same instant that the strip is caught between the two block members. While both the block magnets and the magnet 143 are energized at the same instant by the switch which closes their circuits, the time constant of the block and the magnet 143 may not be the same and hence they would not operate together. In order that they shall operate together, I provide an adjustable connection between the core of magnet 143 and the rod 139 comprising the nuts on the rod, which may be screwed up or down and locked in position so as to vary the relative position of the fixed and movable cores of the magnet 143. The weight 140 on the rod also assists in equalizing the time constant of the block and magnet.

After the strip has entered and been engaged by the block and the magnet 143 has done its work, it is desirable for reasons of economy of current consumption and to prevent the magnet coils from becoming heated, to reduce the current flow in these magnets by inserting a resistance in their circuits and I effect this by the following mechanism shown in Figs. 11 and 13: Pivoted to the lever 146 is a rod 149 which is connected to a switch 150, the latter being closed when the upper guide is in lowered position as in Fig. 11. As the upper guide rises, the rod 149 is depressed and the switch 150 is opened which operates to include a resistance in the magnet windings 129, 130 and 143 controlling the block and detent, respectively.

Referring more particularly to Figs. 5, 15 and 26, I show a method for automatically ejecting the finished coil of strip from the winding block. This mechanism comprises a pair of semi-circular clamps 151, 151, which normally loosely surround the shell of the block upon which the strip is coiled. The clamps are pivoted upon a pin 152 carried by a bracket formed on a sliding rack 153 and are normally spread apart by a spring 154, the contraction of the clamps being limited in extent by the studs which support the spring, and these studs are of such length that when the clamps are fully contracted on the outer block shell, the shell is partially contracted or collapsed so that the coil of strip is free to be moved longitudinally of the block and thus ejected therefrom. Each clamp is provided with a toe 155 which is adapted to be engaged by a member 156 carried by a pivoted lever 157 carrying a roller 158 at one end. This roller is adapted to run up upon a track 159, tapered at one end, and fixed upon a rod 160 secured to the frame work of the machine. The rack 153 and its connected parts are arranged freely to slide upon the rod 160 and are caused to do so by means of a gear 161 to which is fixed a pinion 162 meshing with a segmental gear or quadrant 163. The quadrant is weighted at 164 and pivoted upon a pin 165 carried in a bracket 166 and is actuated by a magnet 167. By reason of this construction the weight 164 acting through the quadrant, pinion and gear, 161, tends to maintain the rack and its parts, including the semi-circular clamps 151 in their extreme right hand position. When the magnet 167 is energized, the rack and clamps are moved in a left hand direction, whereupon the clamps are compressed on the block by the roller as it lifts, causing the outer block shell to collapse and the continued movement of the quadrant carries the clamps along the block pushing the completed coil of strip before it. In this manner the coil of strip may be completely ejected from the block or else partially ejected as desired, depending of course, upon the extent of movement given the clamps, which may be any predetermined amount.

Referring to the wiring diagram of Fig. 26, I show a master switch F connected to a pair of reversing switches R and R' for controlling the direction of rotation of the block driving motor 18. The motor field winding is designated by 168 and the speed of the motor may be controlled manually by a field rheostat 169 and automatically by the operation of the rheostat 95' which is actuated by lever 91. The circuit to the block releasing magnet 143 block magnet 129 and guide releasing magnet 74 is controlled by a switch H having two windings 171 and 172, the winding 172 being energized by a battery G, while the winding 171 is energized by current from the main line after the switch H is closed. The diagram shows the various switches and magnets in de-energized position with the strip guides in position to receive the strip as it comes from the mill and the block motor at rest with the brake applied.

The operation of the electrical features of the apparatus is as follows: The master switch F is first moved in a left hand direction. This closes a circuit to the magnet of the reversing switch R through the stop motion switch 175, the latter being at this time closed, since the roller 93 is held depressed by the extended section 39 of the lower strip guide. The reversing switch R now closes its contacts thereby releasing the brake by the energization of the brake magnet 21 and the motor 18 starts to rotate, an automatically controlled starting resistance 176 being used if considered desirable or necessary. As the switch R closes, a circuit is closed from the + main at the contact 177 through the bottom contacts of the switch H to the magnet 80 and the eccentrics 76 are actuated to force the ends of the guides into close contact with the mill rolls. The speed of the motor may be regulated by the hand rheostat 169 so as to obtain the proper speed of the block and the strip S is then introduced between the mill rolls B—B and is pushed forward between the guides and into contact with the roller 85 which immediately closes a circuit from the battery G through the magnet winding 172 of switch H, the battery being grounded on the machine at a suitable point. While it is perfectly feasible to ground the low tension battery circuit, it would not be advisable to ground a high tension circuit due to the danger of shock to the operator or possible short circuits. Using a battery circuit avoids grounding the power circuit.

The switch H now closes its upper contacts 173 which completes a circuit to the block releasing magnet 143, block magnet 129, guide releasing magnet 74 and the self holding magnet winding 171 of the switch H, the magnets 171 and 172 both being energized for the time being and assist each other in holding the switch H closed. At the same time, the switch H opens its lower contacts thereby open-circuiting the magnet 80. By this time the end of the strip has entered the block and the inner mechanism of the latter expands and firmly clamps the strip between it and the outer shell, the magnet 143 at the same instant releasing the outer block member and the entire block rotates as a unit and proceeds to block or coil the strip. The energization of the magnet 74 effects the release of the guide actuating mechanism and the upper guide is raised upwardly while at the same time the lower guide adjacent the block is retracted. As the upper guide moves up, the roller 85 is carried away from the strip and the battery circuit is interrupted, the switch H remaining closed due to the self holding magnet 171. The upward movement of the guide operates the switch 150 to insert a resistance 174 in the parallel circuits to the block and block-releasing magnet windings and thus cut down the current flow. It is desirable to handle the current for the block in this manner, in that the full current strength should be on when the strip is first attached to the block, but it is not necessary to have the full current on after the strip has begun to wind on the block. When the lower guide is retracted, the roller 93 bears against the strip and hence prevents the weighted arm 91 from actuating the rheostat 95'. As the coil of strip being blocked becomes of larger diameter, the roller 93 is carried upwardly and the arm of the rheostat gradually moves over its contacts thereby removing resistance from the field winding of the block motor 18 and reducing its speed in accordance with the increasing diameter of the coiled strip. When the end of the strip is reached, the arm 91 is free to move upwardly as far as it will go which results in opening the switch 175 and closing the contacts 178. As the switch 175 opens, the circuit to the magnet of the reversing switch R is interrupted and the block and motor 18 come to rest with the brake applied, and the switch H falls open and breaks the circuits to the magnets controlled thereby. The closing of the rheostat contacts 178 energizes the ejector magnet 167 and the completed block of strip is ejected. If, for any reason, the operator desires to rotate the block backward, he merely moves the master switch F in a right hand direction to close a circuit to the reversing switch R' directly across the mains. The operation of this switch raises the brake and starts the motor in a reverse direction, slow or fast as desired, according to the adjustment of the hand operated rheostat 169 in the field circuit of the motor. This same rheostat permits the operator to adjust the speed of the block slightly in excess of the speed of the strip so that when the strip is engaged by the block the latter assumes the same speed as the strip and hence winds the coil under tension.

While the switch 175 is arranged to operate as an automatic stop switch when the blocking of the strip is completed, it is also intended to operate as an automatic starting switch. That is to say, as soon as the completed coil of strip has been removed from the block, the operator rotates the hand wheel 51 to lower the upper guide and extend the lower guide. As the guides move into normal position adjacent the block, the roller 93 and arm 91 are depressed, and the switch 175 closes of itself thereupon completing a circuit to the operating magnet of the reversing switch R and the latter operates again to start the block motor, it being understood that the master switch F remains undisturbed in its left hand position. The switch 175 also acts as an emergency switch operating to stop the block motor in case of a defective strip or if the strip should tear during the blocking process or in case the strip should fail to be caught by the block. In either instance, the arm 91 is free to move the switch 175 to open position and the motor immediately stops.

In reviewing the construction and general arrangement of the parts of the blocking mechanism, and the manner in which they perform their functions, it will be observed that the entire apparatus forms a compact, self-contained structure in which all parts are readily accessible. and in which provision has been made for every necessary or desirable adjustment throughout the entire mechanism. The block may be operated at high speed corresponding to the maximum capacity of the strip mill and hence the output is only limited by the permissible speed of the mill rolls. After one block of strip has been completed and ejected a partial rotation of the hand wheel restores the guides to operative position, the block motor automatically starts and the mechanism is at once ready for another operation. There is no possibility of the operator being injured and the operation of the block may be practically continuous.

Particular attention is directed to the block and the manner in which the advancing edge of the strip enters and is securely caught thereby. Owing to the tapered form of the inner block segments, the strip in every case will be clamped at substantially its center which insures that the strip will coil up on the block uniformly with no tendency to run out of true or to coil up unevenly which might be the case if the strip were caught toward one side particularly if the advancing edge of the strip be ragged or uneven. Another feature of importance is that the block is adapted successfully to handle strips of any width up to the full width of the block and the strips may be of any thickness or material, and they may run at any speed likely to be met in practice. The block does not require any adjustment in case strips of varying width, thickness, or material are used, the only adjustment likely to be needed is when the speed of the strip is varied, in which case the position of the sliding contact roller 85 may be shifted, although it will not be necessary to shift the roller unless the speed of the mill rolls and consequently that of the strip is varied through a wide range. Then again, the block is automatically adjustable for wear since the inner block segments are capable of expanding to a considerably larger diameter than the inside diameter of the outer block shell so that even though there should be considerable wear on the clamping surfaces of the inner and outer block members after long continued use, the magnetization of the block will always effectively clamp the strip no matter how thin it may be. Attention is further directed to the manner in which the strip is directed by the guides to and into the block. The entry slot in the outer block shell is sufficiently wide to accommodate the thickest strip that will ever be used and the strip leaves the guides and passes into the block to any predetermined distance without the possibility of meeting with any obstruction tending to cause a false entry or a buckling of the strip. The guides are automatically withdrawn from the block as soon as the strip is successfully caught or clamped by the block and the subsequent coiling of the strip into a complete coil or block is effected without any possible interference from the guides.

While I have directed particular attention to some of the more important features of the invention, there are many others which have been pointed out in a general way only, but all of these features have a direct bearing upon the successful operation of the device as a whole, and on its value as a commercial proposition.

Without limiting myself to the precise construction and arrangement of parts herein disclosed, what I claim is:—

1. In blocking mechanism adapted to wind a strip coming from a strip mill, the combination of the block, means to drive the same, means to start and stop said driving means, and an electrically-controlled member engaging the block and operated in conjunction with the starting and stopping of said driving means.

2. In blocking mechanism adapted to wind a strip coming from a strip mill, the combination of means for driving the block, manually operated means for controlling said driving means, and an electrically controlled member adapted to engage the block and to hold the same at rest when the block is not being driven and adapted also to be relieved from the block when it is desired to drive the latter.

3. The combination with the revolving block of a strip mill, of a magnet winding in said block, means to drive the block, and electro-responsive means for controlling said block-driving means and for controlling a circuit to the magnet winding in the block.

4. The combination with the revolving block of a strip mill, of a magnet winding in the block, slip rings for conveying current to said winding, means to revolve the block in either direction, and electro-responsive devices for controlling said block revolving means and for directing current to said slip rings.

5. The combination with the revolving block of a strip mill, a magnet winding for the block, a motor for driving the block, manually controlled means for controlling the motor, and means coöperating therewith to manually and automatically control the magnetism of said magnet winding.

6. The combination with the revolving block of a strip mill, a magnet winding for the block, an electro-responsive device for controlling said magnet winding, and independent sources of current supply for controlling said electro-responsive device, one of said sources being a battery.

7. The combination with the revolving block of a strip mill, of a magnet winding for the block, a switch controlling said block winding, and separate magnets for controlling said switch, one of said magnets being adapted to close the switch and another magnet adapted to hold the switch closed.

8. The combination with the revolving block of a strip mill, of a magnet winding for the block, a switch controlling a circuit to said magnet winding, said switch having two windings, one of which is momentarily energized by battery current for closing the switch, and the other winding is adapted to hold the switch closed.

9. The combination with the revolving block of a strip mill, of a magnet winding for the block, a switch controlling a circuit to said magnet winding, said switch having two windings, one of which is momentarily energized by battery current for closing the switch, and the other winding is adapted to hold the switch closed, and electro-magnetic means for controlling the circuit of the winding which holds the switch closed.

10. The combination with the revolving block of a strip mill, of a magnet winding for the block, an electro-responsive device for controlling a circuit to said magnet winding, said device having two windings, the circuit of one of the windings being automatically and momentarily closed by the strip as it comes from the mill, and the circuit of the other of the two windings is controlled by an electro-magnetic switch and adapted to hold said electro-responsive device closed until the said electro-magnetic switch opens and interrupts the circuit.

11. A revolving block comprising two relatively rotatable parts, a magnet winding associated with one of said parts, means for holding the other of said parts against movement, a magnet winding controlling said holding means, and means for simultaneously energizing said magnet windings.

12. A revolving block comprising two relatively rotatable parts, a magnet winding associated with one of said parts, means for holding the other of said parts against movement, a magnet winding controlling said holding means, and an electro-responsive device adapted simultaneously to close a circuit to said magnet windings.

13. A revolving block comprising two relatively rotatable parts, a magnet winding associated with one of said parts, means for holding the other of said parts against movement, a magnet winding controlling said holding means, and a switch adapted simultaneously to close parallel circuits to said magnet windings.

14. A revolving block comprising an outer casing, means for holding the casing against movement, a magnet controlling said holding means, a magnet winding for the block, an electro-magnetic switch for the block magnet, said switch having two windings, one of which is energized by battery current and adapted to close the switch, and the other of the two windings being energized by current from a different source of electric supply when the said switch is closed by the winding energized by battery current, and adapted to hold the switch closed.

15. A revolving block comprising an outer casing, means for holding the casing against movement, a magnet controlling said holding means, a magnet winding for the block, an electromagnetic switch for the block magnet, said switch having two windings, one of the two windings being momentarily energized to close the switch, the other of the two windings being adapted to maintain the switch closed, and automatic means for controlling the circuit of the two windings.

16. A revolving block comprising an outer casing, means for rotating the block, means for holding the casing at rest in a predetermined position, and means to control said holding means, said rotating means and controlling means being simultaneously controlled in stopping the block.

17. The combination with the revolving block of a strip mill, of means for driving the block, a casing for the block, means for holding said casing at rest in a predetermined position, means for releasing said holding means to permit the casing to revolve with the block, and means operating simultaneously to stop the block and control said releasing means.

18. The combination with a strip mill, of a strip winding block, a magnet associated with the block, a casing for the block, means for holding the casing at rest in a predetermined position, an electromagnet for releasing said holding means, automatic means for simultaneously energizing both of said magnets, and manually controlled means for simultaneously deënergizing both of said magnets.

19. The combination with the revolving block of a strip mill, of means to drive the block, a magnet winding associated with the block, a casing surrounding the block, means for holding the casing at rest in a predetermined position, a magnet for releasing said holding means, manually controlled switches for controlling the block driving means, and automatic means for energizing both of said magnets.

20. The combination with the revolving block of a strip mill, of means for guiding the strip to the block, and magnetic means for holding the guiding means in close contact with a mill roll.

21. The combination with the revolving block of a strip mill, guides for directing the strip from the mill rolls to the block, and magnetic means for keeping one of the guides tight against one mill roll, and the other guide tight against the other mill roll.

22. The combination with the revolving block of a strip mill, a guide for directing the strip from the mill to the block, magnetic means for holding said guide against the mill rolls when the strip first enters the guide, and means for releasing said holding means as the strip traverses the guide.

23. The combination with the revolving block of a strip mill, of guide plates extending between the mill rolls and the block, said guide plates being shaped to a knife edge, and magnetic means for pressing one guide plate against the upper mill roll and the other guide plate against the lower mill roll, said guide plates being adapted to scrape the strip from the mill rolls as the strip passes through the mill.

24. The combination with the revolving block of a strip mill, of guides for directing the strip from the mill to the block, an electro-magnet adapted to press said guides against the mill rolls and thereby insure the entering of the strip between the guides, means for energizing said electromagnet upon starting the block rotating, and means automatically to deënergize said electromagnet after the strip has entered the block.

25. The combination with the revolving block of a strip mill, of guides for directing the strip from the mill to the block, an electromagnet adapted to press said guides against the mill rolls and thereby insure the entering of the strip between the guides, manually controlled electro-responsive mechanism for energizing said magnet upon starting the block rotating, and an automatically controlled device for deënergizing said magnet.

26. The combination with the revolving block of a strip mill, of a pair of guides for directing the strip from the mill to the block, an eccentric arranged to expand the guides into contact with the mill rolls, and an electromagnet for controlling said eccentric.

27. The combination with the revolving block of a strip mill, of two guides, one upper and one lower, for guiding the strip between the mill and the block, and electrically controlled means for withdrawing the lower guide from the block and for raising the upper guide above the block after the strip has entered the block.

28. The combination with the revolving block of a strip mill, of two guides, one upper and one lower, for guiding the strip between the mill and the block, and electrically controlled means for withdrawing the lower guide from the block and for raising the upper guide above the block and away from the mill roll after the strip has entered the block.

29. The combination with the revolving block of a strip mill, of a guide comprising an upper and lower part together adapted to direct the strip from the mill to the block, the lower guide part being adapted instantly to be withdrawn from the block and the upper guide adapted simultaneously to be raised above the block and withdrawn from the mill roll when the strip has entered the block, and automatically controlled means for effecting the movements of said upper and lower parts of the guide.

30. The combination with the revolving block of a strip mill, of a guide comprising an upper and lower part together adapted to direct the strip from the mill to the block, electromagnetic means for pressing the guides against an adjacent mill roll, the lower guide part being telescopic and adapted to be withdrawn from the block and the upper guide part being arranged to be raised vertically and withdrawn from engagement with a mill roll, and electromagnetic means for effecting the operation of the guiding means instantaneously when the strip has entered the block.

31. The combination with the revolving block of a strip mill, of means for driving the block, manually controlled electromagnetic means for controlling said block driving means, means for guiding the strip from the mill to the block, and means to withdraw said guiding means from the block when the strip has entered the block, said withdrawing means being controlled by the said manually controlled electromagnetic means.

32. The combination with the revolving block of a strip mill, of means for driving the block, manually controlled electromagnetic means for controlling said block driving means, means for guiding the strip from the mill to the block, and electromagnetic means to withdraw said guiding means from the block when the strip has entered the block, said withdrawing means being controlled by the said manually controlled electromagnetic means.

33. The combination with the revolving block of a strip mill, means for guiding the strip between the mill and block, means for withdrawing the guides from the block after the strip has entered the block, and an electromagnet for controlling said withdrawing means, said magnet being controlled by a switch operated from a battery circuit.

34. The combination with the revolving block of a strip mill, means for guiding the strip between the mill and block, means for withdrawing the guides from the block after the strip has entered the block, and an electromagnet for controlling said withdrawing means, said magnet being controlled by a switch operated from a battery circuit momentarily and also operated by a circuit from a source of current supply other than the battery.

35. The combination with the revolving block of a strip mill, of means for guiding the strip between the mill and block, means to withdraw the guiding means, an electroresponsive device for controlling said withdrawing means, and means dependent on the strip for controlling a battery circuit and thereby control the said electro-responsive device.

36. The combination with the revolving block of a strip mill, means for guiding the strip between the mill and block, electromagnetic means for pressing the guiding means into close contact with the mill rolls, a device operated by the strip to control a battery circuit and thereby causing said electro-magnetic means to relieve the pressure of the guiding means on the mill rolls after the strip has entered the guiding means.

37. The combination with the revolving block of a strip mill, of a magnetic device block within the block, a casing for the block, within the block, a casing for the block, means to hold the casing stationary, a magnetic device for releasing said holding means, and means controlled by the strip and operated by battery current for effecting the simultaneous operation of both of said magnetic devices.

38. The combination with the revolving block of a strip mill constructed to permit the strip to enter therein, of electromagnetic means for clamping the strip to the block, and means operated by the strip to close a battery circuit before the strip reaches the block from the mill and thereby operate said electromagnetic clamping means at the instant the strip enters the block.

39. The combination with the revolving block of a strip mill constructed to permit the strip to enter therein, of electromagnetic means for clamping the strip to the block, and means operated by the strip to close a grounded battery circuit before the strip reaches the block from the mill and thereby operate said electromagnetic clamping means at the instant the strip enters the block.

40. The combination with the revolving block of a strip mill, an electromagnetic device for clamping the strip to the block, a battery circuit momentarily closed by the strip to effect the closing of a circuit to said electromagnetic device from an additional source of current supply to effect the clamping of the strip to the block as the strip enters the block.

41. The combination with the revolving block of a strip mill, of an electromagnetic device for clamping the strip to the block, a battery circuit grounded on the strip mill and connected to a device insulated from the strip mill, and a relay in the battery circuit adapted to be operated upon the closing of the battery circuit by the strip, said relay effecting the closing of a circuit to clamp the strip to the block as it enters the block.

42. The combination with the revolving block of a strip mill, of an electro-magnetic device for clamping the strip to the block, a battery circuit grounded on the strip mill and connected to a device insulated from the strip mill, and a relay in the battery circuit adapted to be operated upon the closing of the battery circuit by the strip, said relay effecting the closing of a circuit to the said electromagnetic device to clamp the strip to the block as it enters the block, and also closing a self holding circuit for the relay.

43. The combination with the revolving block of a strip mill within which the strip is adapted to enter, an electric motor for driving the block, electrical means controlled by the feeding movement of the strip to cause it to be clamped thereto; means automatically to regulate the speed of said motor to maintain a uniform tension on the strip coil as it increases in diameter.

44. The combination with the revolving block of a strip mill, of means for clamping the strip to the block, an electro-magnet for operating said clamping means, and means for varying the speed of the block in accordance with the increasing diameter of the coil of strip on the block.

45. The combination of the revolving block of a strip mill, of an electric motor for driving the block, hand operated means to adjust the driving means to start the block at a proper speed in proportion to the thickness of the strip, and means remote from the block and controlled by the strip for regulating the tension on the strip after the strip is attached to the block.

46. The combination with the revolving block of a strip mill, of an electric motor for driving the block at a predetermined speed, and means remote from the block and actuated by gravity into position to reduce the speed of the motor as the diameter of the coil of strip on the revolving block increases.

47. The combination with the revolving block of a strip mill, of an electric motor for driving the block at a predetermined speed and means remote from the block and actuated into operative position by gravity and under the control of the strip for reducing the speed of the motor as the diameter of the coil of strip on the revolving block increases.

48. The combination with the revolving block of a strip mill, of means for guiding the strip between the mill and the block, and a speed regulating device for the block controlled initially by the said guiding means.

49. The combination with the revolving block of a strip mill, of means for guiding the strip between the mill and the block, a speed regulating device for the block controlled initially by the guiding means, means to withdraw the guiding means from said speed regulating means after the strip has entered the block and thereby allow the regulating means to be controlled by the strip as the latter is coiled on the block.

50. The combination with the revolving block of a strip mill, of means for guiding the strip between the mill and the block, a speed regulating device for the block controlled initially by the guiding means, means to withdraw the guiding means from said speed regulating means after the strip has entered the block and thereby allow the regulating means to be controlled by the strip as the latter is coiled on the block and means to return said regulating means to initial position by the said guiding means.

51. The combination with the revolving block of a strip mill, of means for driving the block, a switch controlling said driving means, and automatic means controlled by the strip for operating said switch to stop said driving means when the coiling of the strip is completed.

52. The combination with the revolving block of a strip mill, of an electric motor for driving the block, a switch for controlling said motor, and means automatically controlled by the strip for operating said switch to stop the block driving motor when the block of strip is completed.

53. The combination with the revolving block of a strip mill, of an electric motor for driving the block, a manually controlled electro-responsive device for starting and stopping the block motor, and means controlled by the strip for automatically operating said electro-responsive device to stop the block motor when the end of the strip is wound on the block.

54. The combination with the revolving block of a strip mill, of an electric motor for driving the block, a switch for controlling a circuit to the motor, automatic means for controlling the speed of the motor, and automatic means for controlling said switch to stop the motor when the end of the strip is wound on the block.

55. The combination with the motor driven block of a strip mill, of a brake, and means for automatically opening the motor circuit and applying the brake to stop the motor and block when the blocking of the strip is completed.

56. The combination with the revolving block of a strip mill, of a guide for directing the strip from the mill to the block, magnetic means for securing the end of the strip to the block, a motor for driving the block, motor controlling means maintained in a predetermined position by said guide, means for withdrawing the guide from said motor controlling means to permit the latter to be controlled by the strip to regulate the speed of the motor and stop the same when the coil of strip is completed.

57. The combination with the revolving block of a strip mill, of a motor for driving the block, magnetic means within the block for clamping the strip to the block, means for guiding the strip between the mill and the block, means for withdrawing said guiding means, an electromagnet for controlling said withdrawing means, a brake adapted to hold the block at rest, electromagnetic switches for controlling the block driving motor, the clamping means in the block, the magnet for the guide withdrawing means and the brake, and means controlled by the strip for controlling said electromagnetic switches.

58. The combination with the revolving block of a strip mill adapted to coil the strip as it comes from the mill, of means controlled by the strip for automatically ejecting the coil of strip from the block.

59. The combination with the revolving block of a strip mill adapted to coil the strip as it comes from the mill, automatic means to stop the block when the coil of strip is completed, and means controlled by the strip for automatically ejecting the completed coil of strip from the block.

60. The combination with the revolving block of a strip mill adapted to coil the strip as it comes from the mill, automatic means to stop the block when the coil of strip is completed, and an electrically operated device for automatically ejecting the completed block of strip from the block.

61. In a blocking device for a strip mill, the combination with the block, of means for driving the block, a base on which said block and its driving means are mounted, a bodily movable lower base on which said first named base is slidably mounted, and guiding means for directing the movement of said last named base.

62. In a blocking device for a strip mill, the combination with the block, of means for driving the block, a base on which said block and its driving means are mounted, a pivoted sub-base on which said base is mounted for bodily movement across the face of the strip mill, and a device for shifting the base on the sub-base in both directions.

63. In a blocking device for a strip mill, the combination with the block, of means for driving the block, a base on which said block and its driving means are mounted, a pivoted sub-base on which said base is slidably mounted, a device for shifting the base on the sub-base in both directions, and means for securing the two bases together, and means for adjusting the swing of said sub-base about its pivot.

64. In a blocking device for a strip mill, the combination with the block, of driving means therefor, a base on which said block and its driving means are mounted, a sub-base on which the base is carried, and movable bodily parallel to the rolls of the strip mill, and manually operable mechanical means connecting the base and sub-base whereby the base is caused to slide bodily on the sub-base.

65. In a blocking device for a strip mill, the combination with the block, of driving means therefor, a base on which said block and its driving means are mounted, a sub-base on which the base is carried, a rack on the base, and a pinion on the sub-base meshing with the rack, whereby the base may be shifted on the sub-base, said sub-base being pivoted toward one end.

66. In a blocking device for a strip mill, the combination with the block, of a guide for directing the strip from the mill to the block, and a base on which said block and guide are carried, said base being pivotally mounted whereby the guide and block may be swung into and out of position with respect to the mill.

67. In a blocking device for a strip mill, the combination with the block, of a guide for directing the strip from the mill to the block, and a base on which said block and guide are carried, said base being slidably carried on a pivotally mounted sub-base whereby the guide and block may be swung into and out of position with respect to the mill and shifted lengthwise of the mill rolls.

68. A blocking device for a strip mill, comprising a block and a guide between the block and mill, and a pivot around which said device may be swung into and out of engagement with the rolls of the mill.

69. A blocking device for a strip mill, a pivoted sub-base, a sliding base on said pivoted sub-base, the blocking device being secured to said sliding base and including a block driving motor, and brake therefor, and controlling mechanism for said motor and brake.

70. A blocking device for a strip mill, a pivoted sub-base, a sliding base on said pivoted sub-base, the blocking device being secured to said sliding base and including a block driving motor, a brake therefor and a guide for guiding the strip from the mill to the block, and means for controlling said motor, brake and guide.

71. A blocking device for a strip mill comprising a winding block, a motor for driving the block, a brake for the motor, a guide for guiding the strip between the block and mill, means to keep the guide in contact with the mill rolls, means automatically to open a circuit to the motor and apply the brake when the coil of strip on the block is completed, and means to withdraw the coil of strip from the block.

72. In a blocking device adapted to coil a strip from a strip mill, the combination of a structure for carrying the block, a frame secured to the structure on the side of the structure and reaching in a direction toward the mill, a pivoted carrier secured to the frame, a pivoted table secured to the carrier, guide plates on said table reaching from the mill rolls and to the block, and means to withdraw said guide plates after the strip has entered the block.

73. The combination with a strip mill and a blocker, a guiding means between the blocker and strip mill for guiding the strip coming from the mill rolls to the blocker, said guiding means being carried by an extension secured to the blocker, and automatically controlled electromagnetic means for pressing said guiding means against the rolls of the mill.

74. The combination with a strip mill and a blocker, of guiding means between the blocker and strip mill for guiding the strip coming from the mill rolls to the blocker, said guiding means being carried by an extension secured to the blocker, and pivoted thereto, automatically controlled electromagnetic means for pressing said guiding means against the mill rolls, and automatically operated means for withdrawing the guiding means from the block after the strip has entered the block.

75. The combination with the revolving block of a strip mill, of guide plates for guiding the strip from the mill to the block, said guide plates being carried by an extension of the block, and a weight adapted to be released by an electromagnet for withdrawing the guide plates from the block after the strip has entered the block.

76. The combination with the revolving block of a strip mill, of guide plates for guiding the strip from the mill to the block, said guide plates being carried by an extension of the block, and a weight adapted to be released by an electromagnet for withdrawing the guide plates from the block after the strip has entered the block, and manually controlled means for restoring said guide plates to initial position.

77. The combination with a strip mill, of a blocker therefor, an extension on the blocker, a table carried by the extension, guide plates between the mill rolls and the block supported on said table, means adapted automatically to raise one guide plate in a vertical direction and withdraw the same from a mill roll and to withdraw the other guide plate from the block, in a horizontal direction, and an electromagnet adapted to effect the operation of both of said guide plates after the strip enters the block.

78. The combination with a strip mill, of a blocker therefor, an extension on the blocker, a table carried by the extension, guide plates between the mill rolls and the block supported on said table, means adapted automatically to raise one guide plate in a vertical direction and withdraw the same from a mill roll and to withdraw the other guide plate from the block in a horizontal direction, and an electromagnet adapted to effect the operation of both of said guide plates after the strip enters the block, and manually operated means for returning said guide plates into initial position between the block and mill rolls.

79. The combination with a strip mill, of a blocker therefor, a guide plate between the mill and blocker for guiding the strip, means to raise said guide plate in a vertical direction, and guiding means for said guide plate arranged to push the guide plate away from engagement with a mill roll when said plate is raised.

80. The combination with a strip mill, of a blocker therefor, a guide plate between the mill and blocker for guiding the strip, means to raise said guide plate in a vertical direction, and guiding means for said guide plate arranged to push the guide plate away from engagement with the mill roll when said plate is operated on, this guide plate being heavier on the end toward the block, and means for guiding the end of said guide plate as the said plate is operated.

81. The combination with a strip mill, of a blocker therefor, a guide plate between the mill and blocker for guiding the strip, means to raise said guide plate in a vertical direction, and guiding means for forcing the guide plate out of engagement with the mill roll, and means to stop said guide plate after it has been moved away from the mill roll a certain distance and to raise the end toward the block to a higher level than the end toward the mill roll, an additional guide plate, and means to withdraw said additional plate horizontally from the block simultaneously with the operation of the said first named guide plate.

82. The combination with a strip mill, of a block for coiling the strip as it comes from the mill, guide plates for guiding the strip from the mill to the block, gravity actuated means for withdrawing said guide plates from the block, and intermediate mechanism comprising a system of levers for simultaneously withdrawing the guide plates from the block after the strip has entered the block.

83. The combination with a strip mill, of a block for coiling the strip as it comes from the mill, guide plates for guiding the strip from the mill to the block, a weight for withdrawing said guide plates from the block, and intermediate mechanism comprising a system of levers for simultaneously withdrawing the guide plates from the block after the strip has entered the block, and guiding means for one of said guide plates for raising the same in a vertical direction above the block.

84. The combination with a strip mill, of a block for coiling the strip as it comes from the mill, guide plates for guiding the strip from the mill to the block, a weight for withdrawing said guide plates from the block, and intermediate mechanism comprising a system of levers for simultaneously withdrawing the guide plates from the block after the strip has entered the block, and guiding means for one of said guide plates for raising the same in a vertical direction above the block, a catch for holding said leverage system against operation, and an electromagnet adapted to release said catch.

85. The combination with the revolving block of a strip mill, of parallel guides for directing the strip from the mill to the block, a carrier for the guides, a support for the carrier, said carrier being adjustably connected to the support whereby the carrier may be adjusted to suit the block and mill rolls, and an extension between the carrier and support, and an adjustable spring for self-adjustment of the carrier.

86. In a blocking device adapted to coil a strip coming from a strip mill, the combination of electrical driving means for the block, a source of current supply therefor, means for clamping the strip to the block, deriving its energy from the said source of current supply, a battery, means in the circuit of said strip clamping means controlled momentarily by said battery, electrical means for ejecting the strip from the block, a circuit for said means closed automatically at the instant the strip is completely blocked, electromagnetic means for holding the circuit of the strip clamping means closed during the blocking operation, and means simultaneously to open this circuit and close the circuit of the said strip ejecting means.

87. In a blocking device for a strip mill, the combination of electrical means for driving the block, means for clamping the strip to the block, a source of current of high voltage controlling said block driving and strip clamping means, a circuit of low voltage, said circuit passing through the strip, means in the circuit of low voltage and actuated thereby to close the circuit of high voltage to the strip clamping means.

88. In a blocking device for a strip mill, a source of current of high voltage, a battery for supplying current of low voltage, a winding in said block to clamp the strip to the block and adapted to be energized by current from said source of high voltage current, means controlled by the battery circuit to close the circuit from the source of high voltage current to the winding of the block, and means automatically controlled to reduce the current of high voltage in the circuit of the block winding.

89. The combination with the revolving block of a strip mill, of a magnet winding block within the block adapted to clamp the strip to the block, and means automatically to reduce the current flow in said winding after the strip is clamped to the block.

90. The combination with the revolving block of a strip mill, of a magnet winding within the block adapted to clamp the strip to the block, and means automatically to reduce the current flow in said winding after the strip is clamped to the block, and to open the circuit to said winding after the block of strip is completed.

91. The combination with the revolving block of a strip mill, comprising an outer and an inner member, of an electromagnet within the block adapted to expand the inner member and thereby clamp the strip to the block, slip rings for conveying current to said magnet, and a resistance adapted to be inserted in the circuit of said magnet after the strip has been clamped to the block.

92. The combination with the revolving block of a strip mill, comprising an outer and an inner member, of an electromagnet within the block adapted to expand the inner member and thereby clamp the strip, slip rings for conveying current to said magnet, a resistance adapted to be inserted in the circuit of said magnet after the strip has been clamped to the block and a switch controlled by the strip for controlling said resistance.

93. The combination with a blocking device for a strip mill, of guide plates for guiding the strip from the mill to the block, a carrier for said guide plates, lever mechanism for withdrawing one of the guide plates from a mill roll and moving the other guide plate in a vertical direction, said lever mechanism being arranged to be shifted over a center after the guide plates have reached the limit of their movement and thereby preventing the return of said guide plates to normal position by reason of their own weight.

94. The combination with a blocking device for a strip mill, of guide plates for guiding the strip from the mill to the block, a carrier for said guide plates, lever mechanism for withdrawing one of the guide plates from a mill roll and moving the other guide plate in a vertical direction, said lever mechanism being arranged to be shifted over a center after the guide plates have reached the limit of their movement and thereby preventing the return of said guide plates to normal position by reason of their own weight, and manual means for returning said guide plates to normal position.

95. In a revolving block for a strip mill, the combination of means for driving the block, means to guide the strip from the mill to the block, means to withdraw the guiding means after the strip has entered the block, and a device controlled initially by said strip guiding means to regulate the speed of the block driving means as the diameter of the roll of strip increases on the block.

96. In a revolving block for a strip mill, the combination of means for driving the block, means to guide the strip from the mill to the block, means to withdraw the guiding means after the strip has entered the block, and a rheostat controlled by said guiding means and by the strip for regulating the speed of said block driving means as the diameter of the coil of strip increases on the block.

97. The combination with the revolving block of a strip mill, of an electric motor for rotating the block, guides for directing the strip from the mill to the block, means for withdrawing said guides after the strip has entered the block, a lever controlled by the strip after the strip has entered the block and the guides have been withdrawn, and a rheostat operated by said lever for reducing the speed of said motor in proportion to the increasing diameter of the coil of strip on the block.

98. The combination with the revolving block of a strip mill, of an electric motor for rotating the block, a brake for the motor, a lever coöperating with the strip between the mill and the block, and a switch operated by said lever for open-circuiting said motor and applying the brake when the strip passes out of coöperative relation with said lever.

99. The combination with the revolving block of a strip mill, of electromagnetic means for ejecting the completed coil of strip from the block, and a weight for restoring said ejecting means to normal position ready for a subsequent operation.

100. The combination with the revolving block of a strip mill, of guide plates adapted to direct the strip from the mill to the block, and hardened steel extension plates formed to an edge and removably secured to the ends of said guide plates for stripping the strip from the mill rolls, and means for automatically withdrawing said plates from stripping position.

101. The combination with the revolving block of a strip mill, of guides for directing the strip between the mill and the block, automatically operated mechanism for withdrawing the guides from guiding position after the strip has entered the block, manual means for operating said mechanism to restore said guides to guiding position, a casing surrounding the block, a catch for holding said casing at rest, an electromagnet for releasing said catch, means for deenergizing said magnet when the coil of strip is completely blocked, and means operated by said guide-withdrawing mechanism for holding said catch out of engagement with the casing until the guides are restored to normal position between the mill and block.

102. The combination with the revolving block of a strip mill, of a motor for rotating the block, a brake for the motor, a magnet winding within the block for clamping the strip to the block, means controlled by the strip for regulating the speed of the motor and for simultaneously open-circuiting the motor, applying the brake, and deënergizing the block magnet when the coil of strip is completed, and ejecting mechanism for automatically removing the coil of strip from the block upon the operation of said controlling means to stop the motor.

103. The combination with the revolving block of a strip mill, of a magnet for clamping the strip to the block, means for closing the circuit of said magnet as the strip enters the block, and additional means for maintaining said circuit closed until the coiling of the strip on the block is completed.

104. The combination with the revolving block of a strip mill, of a shaft rotating with the block, bearings in which the shaft is journaled, a base carrying the bearings, a sub-base on which the base slides, a motor for driving the shaft, controlling apparatus for the motor and block, a controlling switch secured to the sub-base, and a flexible conduit connecting said switch and said motor and block controlling apparatus.

105. A winding block for a strip mill comprising two parts, one of which is adapted to expand within the other and thereby clamp the strip between the two parts, and an electromagnet controlled by the strip for effecting the expansion of the inner block member to clamping position.

106. The combination with the rotatable block of a strip mill, of a motor for driving the block, a brake for the motor, and means for automatically opening the motor circuit and applying the brake in the event of the strip being fractured during the process of blocking.

107. The combination with a rotatable block of a strip mill, of a motor for driving the block, a brake for the motor, and means controlled by the strip for automatically opening the motor circuit and applying the brake in the event of the strip being fractured during the process of blocking.

108. In a blocking mechanism adapted to wind a strip coming from a strip mill, comprising an inner and an outer member, the combination of automatic means for expanding one member to clamp the strip between the two members when the strip reaches the block.

109. In blocking mechanism adapted to wind a strip coming from a strip mill, the combination of a rotatable block comprising an inner and an outer member, automatic means for expanding one of said members to clamp the strip between the said members when it reaches the block, and means automatically to collapse the block after the winding is completed.

110. In blocking mechanism adapted to wind a strip coming from a strip mill, the combination of a rotatable block comprising an inner and an outer member, means to guide the strip from the mill rolls to the block, and means automatically to expand one of said members to cause the strip to be clamped between the members when the strip reaches the block.

111. In metal coiling apparatus, a rotary block, expanding mechanism in said block, an electromagnet in said block, and means operable by the material to be coiled to magnetize said electromagnet, and expand the expanding mechanism automatically.

112. In a metal coiling apparatus, a rotary block, an electromagnet in said block, expanding mechanism in said block, operated by said magnet, an energizing circuit for said magnet, and a controlling circuit closed automatically by the strip to be coiled.

113. In a metal coiling apparatus, a rotary block, a magnet in said block, expanding mechanism operated by said magnet, and means for automatically magnetizing said magnet by the strip of metal as it is brought into definite position relative to the block.

114. In an apparatus for coiling metal strips, a block, a magnet in said block, mechanism in said block adapted to be actuated by said magnet to clamp the strip to the block, an energizing circuit connected with the magnet, and means actuated automatically by an electric current passing through the strip to close said circuit.

115. In an apparatus for coiling metal strips, a rotatable block, mechanism in said block adapted to be expanded to clamp the strip to the block by said mechanism, an energizing circuit for the mechanism, and a controlling circuit for said energizing circuit, including the metal strip.

116. In a blocking mechanism adapted to wind a strip coming from a strip mill, the combination of a rotary block, mechanism for feeding the stock toward the block, expanding mechanism in the block, and electromagnetic means controlled by the stock for causing said magnet to operate the expanding mechanism and thereby cause the stock to be wound on the block.

117. In a blocking mechanism adapted to wind a strip coming from a strip mill, the combination of a rotary block, adapted to receive the strip, an electromagnet within the block, a core in said magnet, means operated by said core for clamping the strip to the block, and means operated electrically through the strip to energize said magnet and cause the strip to be clamped.

118. In a blocking mechanism adapted to wind a strip coming from a strip mill, the combination of a rotary block, said block consisting of an initially stationary collapsible member, a rotatable expanding member, an electromagnet for operating the mechanism in the rotatable member to cause the stock to be clamped between the stationary collapsible member and the rotatable member, and means comprising an electric circuit including the stock itself and closed by the stock when the latter reaches a predetermined position, relative to the block to cause the operation of said magnet.

119. In an automatic blocking apparatus, adapted to wind a strip coming from a strip mill, the combination of a rotatable block, block operating means for causing the strip to be attached to the block, an electro-responsive device for controlling said block operating means, said electro-responsive device being controlled by two windings, a switch independent of the electro-responsive device for energizing one of the windings of said electroresponsive device, the other winding being energized by the operation of the electro-responsive device itself.

120. In an automatic blocking apparatus adapted to wind a strip coming from a strip mill, the combination of a rotatable block, block operating means for causing the strip to be attached to the block, an electro-responsive device for controlling said block operating means, two independent sources of current controlling said electro-responsive device, one source being automatically controlled by means independent of the electro-responsive device to cause the operation of the electro-responsive device, this operation closing the circuit for the other source of current.

121. In an automatic blocking apparatus adapted to wind a strip coming from a strip mill, the combination of a rotatable block, block operating means for causing the strip to be attached to the block, an electro-responsive device for operating said block operating means, two windings for said electro-responsive device, independent sources of electric current for each of said windings, and means automatically to control the current in said windings.

122. In an automatic blocking apparatus adapted to wind a strip coming from a strip mill, the combination of a rotatable block, block operating means for causing the strip to be attached to the block, an electro-responsive device for operating said block operating means, two windings for said device, independent sources of current for said windings, one source being of high voltage and the other of low voltage, and means to control said sources of electric current.

123. In an automatic blocking apparatus, adapted to wind a strip coming from a strip mill, the combination of a rotatable block, block operating means for causing the strip to be attached to the block, an electro-responsive device for operating said block operating means, two independent windings for controlling the operation of said electro-responsive device, one of said windings being adapted for current of high voltage, and the other for current of low voltage, means whereby the winding for low voltage is first energized, and means depending on the operation of the electro-responsive device for the closing of the circuit for the winding of high voltage.

124. In a blocking mechanism adapted to wind a strip coming from a strip mill, the combination of a rotatable block, an electromagnet for controlling said block and causing the strip to be attached to the block, means automatically to close a circuit for controlling the magnetizing of said magnet when the strip is brought into a predetermined position relative to the block, and manually controlled means to regulate the closing of the circuit to determine the position of the strip that the latter may close the circuit.

125. In a blocking mechanism adapted to wind a strip coming from a strip mill, the combination of a relay, a source of electrical energy of low voltage for operating said relay, a source of electrical energy of higher voltage than said first named electrical energy to control the block and controlled by said relay.

126. In an electrically operated and controlled blocking mechanism adapted to wind a strip fed from a strip mill, the combination of means for supplying electrical energy of low voltage, and means for supplying current of higher voltage, the current of high voltage operating the blocking mechanism, and the energy of low voltage controlling the means for supplying the current of high voltage.

127. In electrically and automatically operated and controlled blocking mechanism adapted to wind a strip coming from a strip mill, the combination of means for supplying current of high voltage, and batteries for supplying current of low voltage, the current of high voltage automatically operating the blocking mechanism, the current from the batteries controlling the means for supplying the current of high voltage, and means for automatically controlling the source of electric energy from the batteries.

128. In an electrically operated and controlled blocking mechanism adapted to wind a strip fed from a strip mill, the combination of means for supplying electric energy for operating the blocking mechanism, local batteries for controlling said means, and means for controlling the current from the local batteries.

129. In electrically operated and controlled blocking mechanism adapted to wind a strip coming from a strip mill, the combination of a main power supply circuit for operating the blocking mechanism, and a battery circuit for controlling the main power supply circuit.

130. In an electrically operated and controlled blocking mechanism adapted to wind a strip coming from a strip mill, the combination of a main power supply circuit for supplying power to drive and operate the blocking mechanism, and a battery circuit for controlling the main power supply circuit.

131. In an electrically driven and operated blocking mechanism adapted to wind a strip fed from a strip mill, the combination of an electric motor for driving the mechanism, electromagnetic devices for operating the mechanism, electromagnetically operated switches for controlling said motor and said electromagnetically operating devices, and a manual circuit closer at a remote place from said motor, said electromagnetically operating devices and said electromagnetically controlled switches, for controlling said electromagnetically controlled switches.

132. In an electrically operated and controlled blocking mechanism adapted to wind a strip fed from a strip mill, the combination of electric energy derived from a main suppply circuit for operating the blocking mechanism, and batteries for supplying current for momentarily controlling the energy derived from the main power supply circuit.

133. In an electrically operated and controlled blocking mechanism adapted to wind a strip fed from a strip mill, the combination of electric energy derived from a main power supply circuit for operating the blocking mechanism, batteries for supplying electric energy, automatic means whereby the battery circuit controls the energy from the main power supply circuit, and automatic means for opening the battery circuit.

134. In a mechanism adapted to wind a strip coming from a strip mill, the combination of a rotatable block, electromagnetic means for causing the strip coming from the mill to be attached to the block, a circuit for said electromagnetic means, and means automatically to reduce the current flow in said circuit after the strip is attached to the block.

135. In a mechanism adapted to wind a strip coming from a strip mill, the combination of a rotatable block, electromagnetic means for causing the strip coming from the mill to be attached to the block, a circuit for said electromagnetic means, and an opposition element for reducing the current flow in said circuit after the strip is attached to the block.

136. In a mechanism adapted to wind a strip coming from a strip mill, the combination of a rotatable block, electromagnetic means for causing the strip coming from the mill to be attached to the block, a circuit for said electromagnetic means, an opposition element in said circuit, means to short circuit said opposition element, and means to open said short circuit after the strip is attached to the block.

137. In a mechanism adapted to wind a strip coming from a strip mill, the combination of a rotatable block, electromagnetic means for causing the strip coming from the mill to be attached to the block, a circuit for said electromagnetic means, an opposition element for modifying the current in said circuit, said opposition element being short circuited before the strip is attached to the block, and means to open said short circuit after the strip is attached to the block.

138. The combination with the revolving block of a strip mill, of an electric motor for driving the block, and means remote from the block and controlled by the strip for controlling the motor to insure a constant predetermined tension on the strip throughout the blocking operation.

139. The combination with the revolving block of a strip mill, of an electric motor for driving the block, and means remote from the block and in engagement with the strip for controlling the motor to insure the proper speed thereof to exert a constant predetermined tension on the strip throughout the blocking operation.

140. The combination with the revolving block of a strip mill, of an electric motor for driving the block, and means remote from the block and in engagement with the strip for controlling the motor by the increasing diameter of the block as the strip is wound thereon to insure a proper speed of the motor to exert a constant predetermined tension on the strip throughout the blocking operation.

141. The combination with the revolving block of a strip mill, of means to drive the block, hand operated means to adjust the driving means to start the block at a proper speed in proportion to the thickness of the strip, and means remote from the block and controlled by the strip to maintain a constant predetermined tension on the strip in proportion to the thickness of the strip.

142. The combination with the revolving block of a strip mill, of an electric motor for driving the block, an electrically controlled member engaging the block, and an electro-responsive device for controlling said motor and electrically controlled member.

143. A blocking device adapted to coil a strip delivered by a mill, an electric motor for driving the block, a spring-pressed member engaging the block for holding the same at rest, and an electromagnet for releasing said spring-pressed member concurrently with the starting of the motor.

144. A winding block for a strip mill comprising a casing having a slot for the entrance of the strip, a rotating member within said casing, and means for expanding said rotating member automatically as the strip enters the slot a predetermined distance in order to effect the clamping of the strip between the casing and said expanding member.

145. A winding block for a strip mill comprising a revolving expanding member, a casing surrounding said member and normally at rest, means for introducing the end of the strip between the expanding member and the casing, and means controlled by the strip for expanding said member into frictional engagement with the strip and casing whereby the expanding member, casing and the end of the strip revolve as a unit to coil the strip on the casing.

146. In blocking mechanism adapted to wind a strip coming from a strip mill, the combination of a rotatable block comprising inner and outer members, means to guide the strip from the mill rolls to the block, means automatically to expand one of said members to cause the strip to be clamped between the members when the strip reaches the block, and means automatically to collapse the block after the winding is completed.

147. In blocking mechanism adapted to wind a strip coming from a strip mill, the combination of a rotatable block comprising inner and outer members, and means controlled by the feeding movement of the strip automatically to expand one of said members to cause the strip to be clamped between the members when the strip reaches the block.

148. In blocking mechanism adapted to wind a strip coming from a strip mill, the combination of a rotatable block comprising inner and outer members, means controlled by the feeding movement of the strip automatically to expand one of said members to cause the strip to be clamped between the members when the strip reaches the block, and means automatically to collapse the block after the winding is completed.

149. In blocking mechanism adapted to wind a strip coming from a strip mill, the combination of a rotatable block comprising inner and outer members, and electrical means controlled by the feeding movement of the strip to automatically expand one of said members to cause the strip to be clamped between the members when the strip reaches the block.

150. In blocking mechanism adapted to wind a strip coming from a strip mill, the combination of a rotatable block comprising inner and outer members, an electrical circuit controlled by the feeding movement of the strip, a relay in said circuit, and means controlled by said relay to expand one of said members to cause the strip to be clamped between the members when the strip reaches the block.

151. In blocking mechanism adapted to wind a strip coming from a strip mill, the combination of a rotatable block, comprising inner and outer members, an electrical circuit controlled by the feeding movement of the strip, a relay in said circuit, and electromagnetic means controlled by the said relay to expand one of said members to cause the strip to be clamped between the members when the strip reaches the block.

152. In blocking mechanism adapted to wind a strip coming from a strip mill, the combination of a rotatable block comprising inner and outer members, an electrical circuit controlled by the feeding movement of the strip, a relay in said circuit, electromagnetic means controlled by said relay to expand one of said members to cause the strip to be clamped between the members when the strip reaches the block, and automatic means to collapse the block after the winding is completed.

153. A revolving block for a strip mill comprising an outer casing, and an inner rotatable mechanism, means for holding said casing at rest in a predetermined position while said inner mechanism is rotating, means to release said outer casing to permit it to rotate with the internal rotating mechanism, and an electromagnet for controlling said holding and releasing means.

154. A revolving block for a strip mill, comprising an outer casing, and an inner rotatable mechanism, means for holding said casing at rest in a predetermined position while said inner mechanism is rotating, means to release said outer casing to permit it to rotate with the internal rotating mechanism, and means controlling automatically the holding and releasing means.

155. In strip winding mechanism, the combination of a rotatable block comprising inner rotatable mechanism and an external casing between which the strip is clamped, mechanism for holding said casing at rest, said mechanism being constructed to be self-releasing when the strip is attached to the block, and additional means to release said mechanism.

156. In strip winding mechanism, the combination of a rotatable block comprising inner rotatable mechanism and an external casing between which the strip is clamped, and mechanism for holding said casing at rest, said mechanism being constructed to be released by the rotating force exerted on the casing when the strip is clamped between the inner mechanism and said casing.

157. In strip winding mechanism, the combination of a rotatable block comprising inner rotatable expandible mechanism and an external collapsible casing between which the strip is clamped, means for holding said casing at rest until the strip has entered, said means being constructed to be self-releasing to allow the casing to rotate with the inner mechanism when the latter is expanded and the strip clamped.

158. In mechanism adapted to wind a strip coming from a strip mill, the combination of a rotatable block, comprising a plurality of inner expandible members and an outside member comprising a plurality of hinged-together sections adapted to be rotated in unison, a hand wheel for controlling the outside members independently of the inside expandible members when the latter are not expanded, and means for holding the outside members in position after they have been adjusted to such position by said hand wheel.

159. In mechanism adapted to wind a strip coming from a strip mill, the combination of a rotatable block, comprising an outer casing and inner rotatable expanding mechanism, a slot in the casing whereby the strip may enter between the casing and the inner expanding mechanism, manually operable means to adjust the casing so that the slot may be in position to receive the strip as it comes from the strip mill, and means to hold the said casing in such adjusted position until the strip has been clamped between the casing and the inner expanding mechanism.

160. A revolving block for a strip mill, comprising an outer casing, and inner rotatable mechanism, means for holding said casing at rest in a predetermined position while said inner mechanism is rotating, and an electromagnet for releasing said holding means.

161. The combination with the revolving block of a strip mill, of a casing surrounding the block, means for guiding the end of the strip between said block and casing, and an electromagnet within said block adapted to clamp the strip between the block and casing.

162. In a rotatable block adapted to wind a strip fed from a strip mill, the combination of an inner rotatable member comprising a plurality of expandible members, an outer part comprising a cylindrical casing formed in yieldable sections hinged together to form a smooth surface with the strip wound thereon, means to rotate the inner part independently of the outer, means to hold the outer part stationary while the inner is rotating, and means to expand the inner part to release said holding means and cause the outer part to rotate with the inner part.

163. In a blocking device for a strip mill, the combination of a rotatable block adapted to wind a strip fed from a strip mill, guiding means between the mill and the block, a common operating device for clamping the strip to the block and for effecting the withdrawal of the guiding means immediately after the strip has been clamped to the block.

164. In a blocking device for a strip mill, the combination of a rotatable block adapted to wind a strip fed from a strip mill, said block comprising an inner rotatable mechanism and an outer rotatable mechanism, means to hold said outer rotatable mechanism at rest, guiding means between the mill and said block, and a device for simultaneously effecting the clamping of the strip to the block, the release of the outside rotatable mechanism of the block and the withdrawal of the guiding means.

In testimony whereof, I have signed my name to this specification in the presence of two subscribing witnesses.

AUGUST SUNDH.

Witnesses:
 WALTER C. STRANG,
 JAMES G. BETHELL.